(12) United States Patent
Furman et al.

(10) Patent No.: US 12,330,772 B1
(45) Date of Patent: Jun. 17, 2025

(54) FAULT-TOLERANT MULTI-PROCESSOR SYSTEMS AND METHODS FOR AN AIRCRAFT

(71) Applicant: Archer Aviation Inc., San Jose, CA (US)

(72) Inventors: Scott Furman, Menlo Park, CA (US); Fernanda Aline Matta De Paiva, Los Altos Hills, CA (US); Sergio Henrique Soares Ferreira, San Jose, CA (US); Guy Bernard, Kirkland (CA); Damien Bardon, San Jose, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/813,435

(22) Filed: Aug. 23, 2024

(51) Int. Cl.
*G06F 17/00* (2019.01)
*B64C 19/00* (2006.01)
*B64F 5/60* (2017.01)

(52) U.S. Cl.
CPC .............. *B64C 19/00* (2013.01); *B64F 5/60* (2017.01)

(58) Field of Classification Search
CPC ................................ B64C 19/00; B64F 5/60
USPC ............................................................. 701/3
See application file for complete search history.

(56) References Cited

U.S. PATENT DOCUMENTS

| | | | | |
|---|---|---|---|---|
| 4,015,246 A * | 3/1977 | Hopkins, Jr. | ....... | G06F 11/2007 714/E11.069 |
| 4,583,224 A * | 4/1986 | Ishii | .......................... | H04L 1/22 714/10 |
| 4,907,232 A * | 3/1990 | Harper | .................. | G06F 11/185 714/E11.069 |
| 5,001,646 A | 3/1991 | Caldwell et al. | | |
| 5,598,529 A * | 1/1997 | Garay | .................... | G06F 11/182 714/11 |
| 9,898,033 B1 | 2/2018 | Long | | |
| 11,323,214 B2 * | 5/2022 | MacAfee | .................. | H04L 1/08 |

(Continued)

FOREIGN PATENT DOCUMENTS

EP 3891067 B1 1/2024
WO 2020180373 A2 9/2020

OTHER PUBLICATIONS

Advanced Avion (Year: 1977).*

(Continued)

*Primary Examiner* — Ronnie M Mancho
(74) *Attorney, Agent, or Firm* — Finnegan, Henderson, Farabow, Garrett & Dunner, LLP

(57) ABSTRACT

Aspects of the present disclosure generally relate to systems and methods for flight control of aircrafts driven by electric propulsion systems and in other types of vehicles. In some embodiments, a computer-implemented method for controlling an aircraft is disclosed, comprising: receiving, from a source processor, a first copy of a signal corresponding to an input device; sending a second copy of the signal to all other processors; receiving a number of second copies of the signal from all other processors, the number of second copies being equal to the number of all other processors excluding the source processor; determining a consensus signal based on the first copy and the second copies of the signal; and determining a command signal for an effector of the aircraft based on the consensus signal, and wherein no two processors are configured to receive signals from a same input device.

30 Claims, 17 Drawing Sheets

(56) References Cited

U.S. PATENT DOCUMENTS

| | | |
|---|---|---|
| 11,757,382 B2 | 9/2023 | Mores et al. |
| 11,822,330 B2 | 11/2023 | Stephan et al. |
| 11,866,195 B2 | 1/2024 | Yuksel et al. |
| 11,939,041 B2 | 3/2024 | Zwiener et al. |
| 2002/0153452 A1 | 10/2002 | King et al. |
| 2004/0093130 A1 | 5/2004 | Osder et al. |
| 2010/0076625 A1 | 3/2010 | Yoeli |
| 2013/0138270 A1 | 5/2013 | Christensen et al. |
| 2015/0120009 A1* | 4/2015 | Killian ............... G05B 23/0291 700/79 |
| 2019/0332125 A1 | 10/2019 | Irwin, III et al. |
| 2020/0333805 A1 | 10/2020 | English et al. |
| 2024/0310850 A1 | 9/2024 | Stephan |

OTHER PUBLICATIONS

Lala et al. (1994). Architectural principles for safety-critical real-time applications. Proceedings of the IEEE, 82(1), 25-40. https://doi.org/10.1109/5.259424.

Nayak et al. (2019). Authenticated Synchronous BFT. Github.io. https://decentralizedthoughts.github.io/2019-11-11-authenticated-synchronous-bft/.

Ulrich et al. (2003). Formally verified Byzantine agreement in presence of link faults. https://doi.org/10.1109/icdcs.2002.1022311.

Loveless et al. (2021). IGOR: Accelerating Byzantine Fault Tolerance for Real-Time Systems with Eager Execution. https://doi.org/10.1109/rtas52030.2021.00036.

Pease et al. (1980). Reaching Agreement in the Presence of Faults. Journal of the ACM, 27(2), 228-234. https://doi.org/10.1145/322186.322188.

Biely et al. (2011). Synchronous consensus under hybrid process and link failures. Theoretical Computer Science, 412(40), 5602-5630. https://doi.org/10.1016/j.tcs.2010.09.032.

Schneider (2006). The State Machine Approach: A Tutorial. Springer EBooks, 18-41. https://doi.org/10.1007/bfb0042323.

Walker, G., et al., "F-35B Integrated Flight-Propulsion Control Development", 2013 international powered lift conference, 2013, 15 pages.

Vigano, L., et al., "Development of augmented control laws for a tilt rotor in low and high speed flight modes", European Rotorcraft Forum, 2017, 14 pages.

Denham, J., et al., "Converging on a precision Hover control strategy for the F-35B Stovl aircraft.", AIAA Guidance, Navigation and Control Conference and Exhibit, 2006, 13 pages.

Whittle, R., "Flying The Osprey Is Not Dangerous, Just Different: Veteran Pilots", Breaking Defense, Sep. 5, 2012, 11 pages.

Kang, Y., et al., "Development of flight control system and troubleshooting on flight test of a tilt-rotor unmanned aerial vehicle", International Journal of Aeronautical and Space Sciences 17.1, 2016, p. 120-131, 12 pages.

* cited by examiner

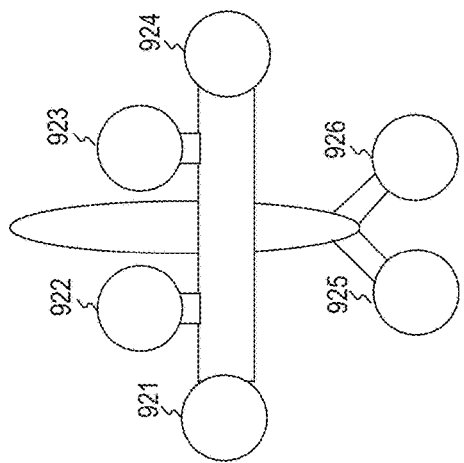
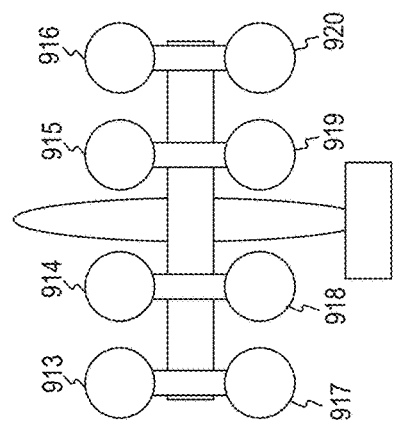
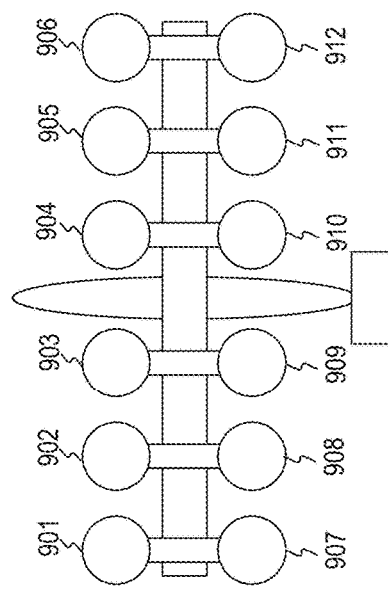
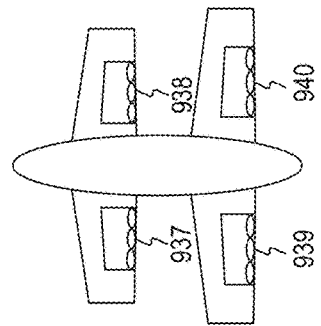
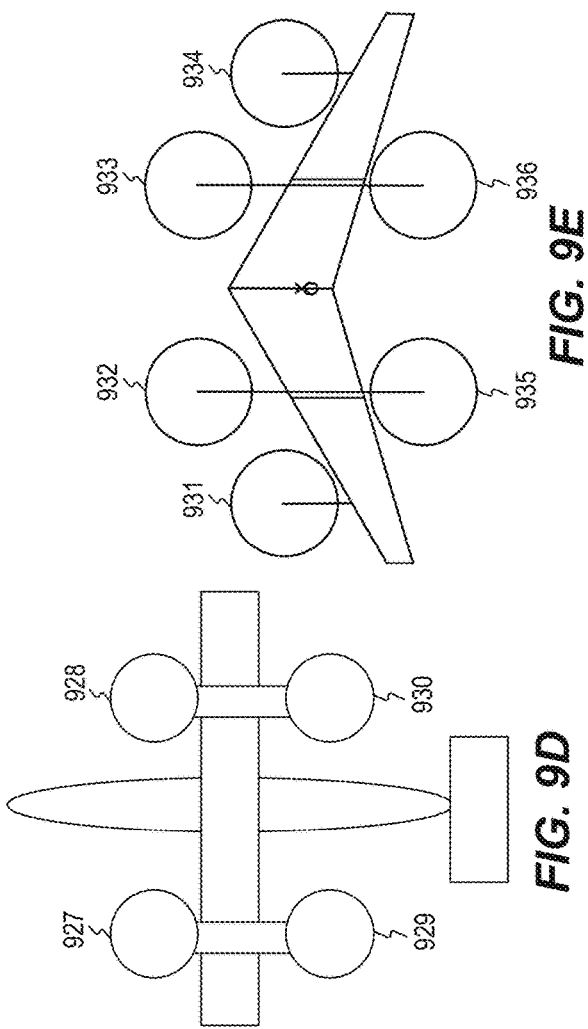

FAULT-TOLERANT MULTI-PROCESSOR SYSTEMS AND METHODS FOR AN AIRCRAFT

TECHNICAL FIELD

This disclosure relates generally to powered aerial vehicles, and more particularly, and without limitation, the present disclosure relates to innovations in aircrafts driven by electric propulsion systems. Certain aspects of the present disclosure generally relate to systems and methods for flight control of aircrafts driven by electric propulsion systems and in other types of vehicles, as well as flight control of aircrafts in flight simulators and video games. Other aspects of the present disclosure generally relate to improvements in flight control systems and methods that provide particular advantages in aerial vehicles and may be used in other types of vehicles.

BACKGROUND

The inventors here have recognized several problems that may be associated with the fault tolerance of multi-processor systems, including those systems in which the operation of the processors is safety critical. For example, such multi-processor systems may include an aircraft, including a tilt-rotor aircraft that uses electrical or hybrid-electric propulsion systems; a submarine; a server; or any other multi-processor system in which the expected operation of the processors is critical to expected function of the system.

Some complex aircrafts, including those with vertical takeoff and landing capabilities or distributed propulsion systems, may comprise a significantly higher number of actuators or effectors than conventional aircrafts, thus requiring more advanced techniques for generating fault-tolerant effector commands. These techniques may also be used to provide similar benefits in conventional aircraft or other systems.

Therefore, there is a need for improved fault-tolerant multi-processor systems and methods for certain aircraft.

SUMMARY

The present disclosure relates generally to flight control of electric aircraft and other powered aerial vehicles. More particularly, and without limitation, the present disclosure relates to innovations in tilt-rotor aircraft that use electrical propulsion systems. For example, certain aspects of the present disclosure relate to fault-tolerant multi-processor systems and methods for an aircraft.

Disclosed embodiments may include a signal-processing multi-processor system configured to perform input sharing between processors. For example, each processor in the system may be running identical and synchronized finite state machines. In order for each finite state machine to generate the expected output, they must receive the same input at essentially the same time. Further, the input needs to be correct to prevent a faulty output. One way to ensure the same input is provided to each finite state machine with highly reasonable assurance of its validity is to implement an input sharing scheme between the processors. Each processor may be configured to receive a signal from an input device and share the signal to each other processor via one or more rounds of sharing. Then each processor may implement a voting algorithm on all received copies of the signal to determine a consensus signal. The consensus signal may be used as an input into a control law algorithm to determine one or more command signals for an effector of the system. In this way, each processor is highly reasonably certain the input used is correct (e.g., not faulty or not corrupted), which helps to ensure correct command signals are sent to effectors, improving aircraft reliability and safety. Further, input sharing may allow each processor to determine if another processor is malfunctioning.

Disclosed embodiments may include a signal-processing multi-processor system configured to perform erroneous command mitigation operations. For example, the system may comprise a plurality of pairs of processors (e.g., dual-dual system, triple-dual system), and each pair may comprise a processor configured to monitor the output of the other processor. If the monitoring processor detects the output of the other processor does not match its own output, the monitoring processor may inhibit or shut down the other processor.

Disclosed embodiments may include a signal-processing multi-processor system configured to perform input validation operations. For example, an effector of the system may determine a classification of a received signal and may only act on the received signal after one or more conditions associated with the determined classification is satisfied.

One aspect of the present disclosure comprises a signal-processing multi-processor system for an aircraft, comprising: a plurality of processors, wherein each processor is configured to perform operations comprising: receiving, from a source processor among the plurality of the processors, a first copy of a signal corresponding to an input device; sending the first copy of the signal to all other processors of the plurality excluding the source processor; receiving a number of second copies of the signal from all other processors of the plurality excluding the source processor, the number of second copies being equal to the number of all other processors of the plurality excluding the source processor; determining a consensus signal based on the first copy and the second copies of the signal; and determining a command signal for an effector of the aircraft based on the consensus signal, and wherein no two processors of the plurality are configured to receive signals from a same input device.

Another aspect of the present disclosure comprises a computer-implemented method for controlling an aircraft, comprising: receiving, from a source processor among a plurality of processors, a first copy of a signal corresponding to an input device; sending the first copy of the signal to all other processors of the plurality excluding the source processor; receiving a number of second copies of the signal from all other processors of the plurality excluding the source processor, the number of second copies being equal to the number of all other processors of the plurality excluding the source processor; determining a consensus signal based on the first copy and the second copies of the signal; and determining a command signal for an effector of the aircraft based on the consensus signal, and wherein no two processors of the plurality are configured to receive signals from a same input device.

Another aspect of the present disclosure comprises a non-transitory computer-readable medium storing instructions that, when executed by at least one processor, cause the at least one processor to perform operations comprising: receiving, from a source processor among a plurality of processors, a first copy of a signal corresponding to an input device; sending the first copy of the signal to all other processors of the plurality excluding the source processor; receiving a number of second copies of the signal from all other processors of the plurality excluding the source processor, the number of second copies being equal to the number of all other processors of the plurality excluding the source processor; determining a consensus signal based on the first copy and the second copies of the signal; and determining a command signal for an effector of the aircraft based on the consensus signal, and wherein no two processors of the plurality are configured to receive signals from a same input device.

Another aspect of the present disclosure comprises a signal-processing multi-processor system for an aircraft, comprising: a first pair of processors comprising a first command processor and a first monitor processor; a second pair of processors comprising a second command processor and a second monitor processor; and an effector configured to act based on the command signal received from the first pair of processors, wherein each monitor processor is configured to: compare a first command signal generated by a corresponding command processor with a second command signal generated by the monitor processor; and in response to determining the first command signal differs from the second command signal, inhibit the corresponding command processor.

Another aspect of the present disclosure comprises a computer-implemented method for controlling an aircraft, comprising: comparing a first command signal generated by a command processor with a second command signal generated by a monitor processor; determining if the first command signal substantially differs from the second command signal; if the first command signal does not substantially differ from the second command signal: sending the first command signal to an effector; and if the first command signal does substantially differ from the second command signal: inhibiting the corresponding command processor.

Another aspect of the present disclosure comprises a non-transitory computer-readable medium storing instructions that, when executed by at least one processor, cause the at least one processor to perform operations comprising: comparing a first command signal generated by a command processor with a second command signal generated by a monitor processor; determining if the first command signal substantially differs from the second command signal; if the first command signal does not substantially differ from the second command signal: sending the first command signal to an effector; and if the first command signal does substantially differ from the second command signal: inhibiting the corresponding command processor.

Another aspect of the present disclosure comprises a signal-processing multi-processor system for an aircraft, comprising: an effector; and a plurality of processors, wherein the effector is configured to: receive a command signal from a processor among the plurality of processors; determine if the command signal is classified as reversible or not reversible; if the command signal is classified as reversible: act based on the command signal after receiving only a single copy of the command signal; and if the command signal is classified as not reversible: act based on the command signal only after receiving multiple copies of the command signal.

Another aspect of the present disclosure comprises a computer-implemented method for controlling a device, comprising: receiving a command signal from a processor among a plurality of processors; determining if the command signal is reversible or not reversible; if the command signal is classified as reversible: acting based on the command signal after receiving only a single copy of the command signal; and if the command signal is classified as not reversible: acting based on the command signal only after receiving multiple copies of the command signal.

Yet another aspect of the present disclosure comprises a non-transitory computer-readable medium storing instructions that, when executed by at least one processor, cause the at least one processor to perform operations comprising: receiving a command signal from a processor among a plurality of processors; determining if the command signal is classified as reversible or not reversible; if the command signal is classified as reversible: acting based on the command signal after receiving only a single copy of the command signal; and if the command signal is classified as not reversible: acting based on the command signal only after receiving multiple copies of the command signal.

BRIEF DESCRIPTION OF THE DRAWINGS

FIGS. 9A-9F illustrate exemplary top plan views of VTOL aircraft, consistent with disclosed embodiments.

DETAILED DESCRIPTION

Figure 1:
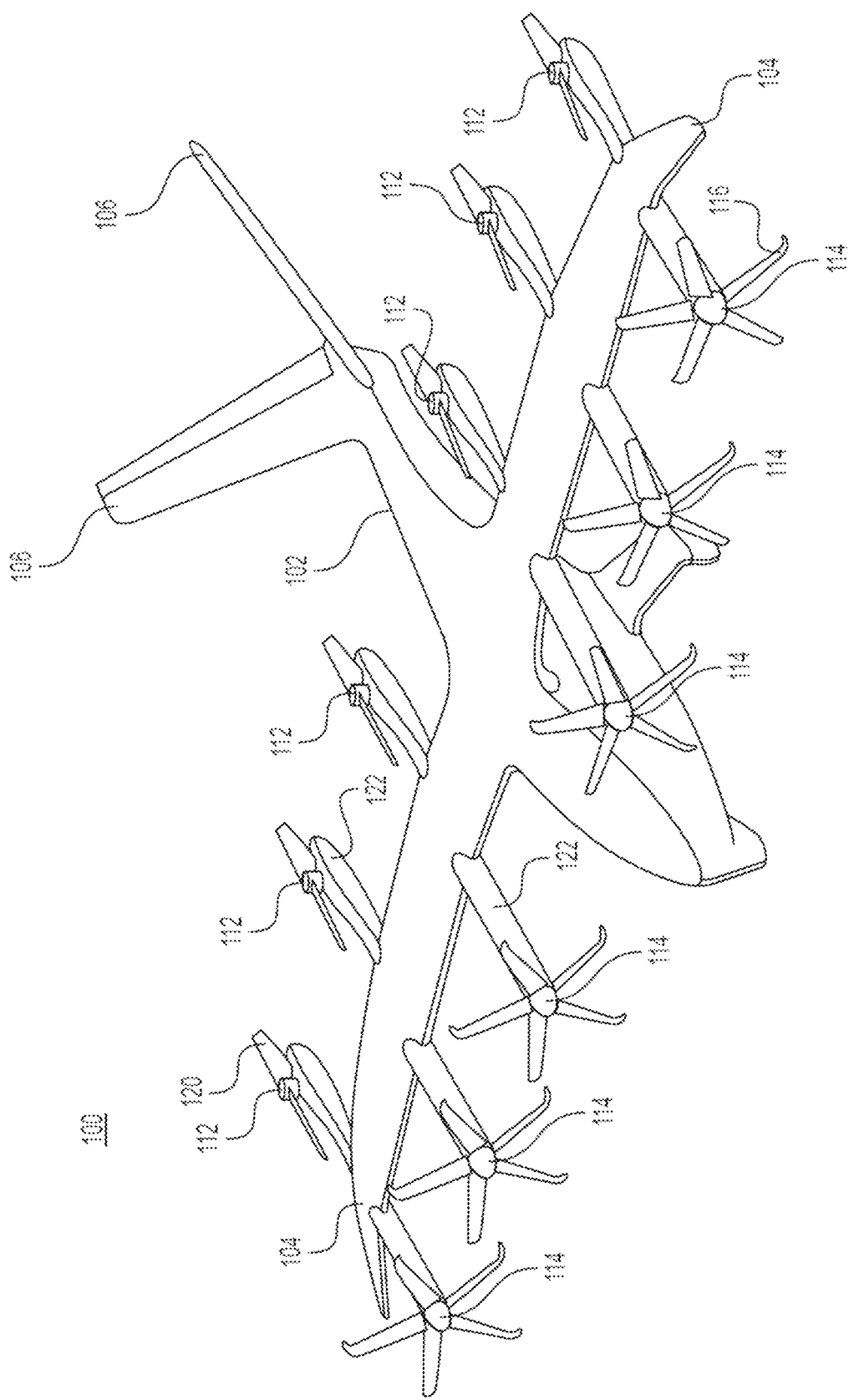
FIG. 1 shows an exemplary VTOL aircraft, consistent with disclosed embodiments.

The present disclosure addresses systems, components, and techniques primarily for use in an aircraft. The aircraft may be an aircraft with a pilot, an aircraft without a pilot (e.g., a UAV), a drone, a helicopter, and/or an airplane. An aircraft includes a physical body and one or more components (e.g., a wing, a tail, a propeller) configured to allow the aircraft to fly. The aircraft may include any configuration that includes at least one propeller. In some embodiments, the aircraft is driven (e.g., provided with thrust) by one or more electric propulsion systems (hereinafter referred to as electric propulsion units or "EPUs"), which may include at least one engine, at least one rotor, at least one propeller, or any combination thereof. The aircraft may be fully electric, hybrid, or gas powered. For example, in some embodiments, the aircraft is a tilt-rotor aircraft configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration. Accordingly, it is desirable to control the aircraft components using fault-tolerant systems and methods to decrease the risk of any component failure affecting the safe operation of the aircraft.

Disclosed embodiments provide new and improved configurations of aircraft components, some of which are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft (e.g., electric aircraft or hybrid-electric aircraft) driven by a propulsion system.

In some embodiments, the aircraft driven by a propulsion system of the present disclosure may be designed to be capable of both vertical takeoff and conventional takeoff and landing, with a distributed propulsion system enabling vertical flight, horizontal and lateral flight, and transition (e.g., transitioning between vertical flight and horizontal flight). The aircraft may generate thrust by supplying high voltage electrical power to a plurality of engines of the distributed propulsion system, which may include components to convert the high voltage electrical power into mechanical shaft power to rotate a propeller.

Embodiments may include an electric engine (e.g., motor) connected to an onboard electrical power source, which may include a device capable of storing energy such as a battery or capacitor, and may optionally include one or more systems for harnessing or generating electricity such as a fuel powered generator or solar panel array. In some embodiments, the aircraft may comprise a hybrid aircraft configured to use at least one of an electric-based energy source or a fuel-based energy source to power the distributed propulsion system. In some embodiments, the aircraft may be powered by one or more batteries, internal combustion engines (ICE), generators, turbine engines, or ducted fans.

The engines may be mounted directly to the wing, or mounted to one or more booms attached to the wing. The amount of thrust each engine generates may be governed by a torque command from a Flight Control System (FCS) over a digital communication interface to each engine. Embodiments may include forward engines (and associated propellers) that are capable of altering their orientation, or tilt.

The engines may rotate the propellers in a clockwise or counterclockwise direction. In some embodiments, the difference in propeller rotation direction may be achieved using the direction of engine rotation. In other embodiments, the engines may all rotate in the same direction, and gearing may be used to achieve different propeller rotation directions.

In some embodiments, an aircraft may possess quantities of engines in various combinations of forward and aft engine configurations. A forward engine may be considered an engine that is positioned predominantly towards the leading edge of a wing. An aft engine may be considered an engine that is positioned predominantly towards the trailing edge of a wing. For example, an aircraft may possess six forward and six aft engines, five forward and five aft engines, four forward and four aft engines, three forward and three aft engines, two forward and two aft engines, or any other combination of forward and aft engines, including embodiments where the number of forward engines and aft engines are not equivalent.

In some embodiments, for a vertical takeoff and landing (VTOL) mission, the forward and aft engines may provide vertical thrust during takeoff and landing. During flight phases where the aircraft is moving forward, the forward engines may provide horizontal thrust, while the propellers of the aft engines may be stowed at a fixed position in order to minimize drag. The aft engines may be actively stowed with position monitoring.

Transition from vertical flight to horizontal flight and vice-versa may be accomplished via the tilt propeller subsystem. The tilt propeller subsystem may redirect thrust between a primarily vertical direction during vertical flight phase (e.g., hover-phase) to a horizontal or near-horizontal direction during a forward-flight cruising phase, based on a tilt of one or more propellers (e.g., determining directionality of one or more propellers). A variable pitch mechanism may change the forward engine's propeller-hub assembly blade collective angles for operation during phases of flight, such as a hover-phase, transition phase, and cruise-phase. Vertical lift may be thrust in a primarily vertical direction (e.g., during a hover-phase). Horizontal thrust may be thrust in a primarily horizontal direction (e.g., during a cruise-phase).

In some embodiments, a "phase of flight," or "flight mode," (e.g., hover, cruise, forward flight, takeoff, landing, transition) may be defined by a combination flight conditions (e.g., a combination of flight conditions within particular ranges), which may include one or more of an airspeed, altitude, pitch angle (e.g., of the aircraft), tilt angle (e.g., of one or more propellers), roll angle, rotation speed (e.g., of a propeller), torque value, pilot command, or any other value indicating a current or requested (e.g., commanded) state of at least part of the aircraft.

In some embodiments, in a conventional takeoff and landing (CTOL) mission, the forward engines may provide horizontal thrust for wing-borne take-off, cruise, and landing, and the wings may provide vertical lift. In some embodiments, the aft engines may not be used for generating thrust during a CTOL mission and the aft propellers may be stowed in place. In other embodiments, the aft engines may be used at reduced power to shorten the length of the CTOL takeoff or landing.

As detailed herein, embodiments of the aircraft may include many movable structural flight elements that allow pilots to safely control the aircraft. Flight control surfaces (e.g., flaperons, flaps, ailerons, elevators, rudders, etc.) are critical to controlling the positioning of the aircraft. Changes to the orientation of these surfaces changes the airflow and pressure distribution around the aircraft, allowing the pilot to control the movement of the aircraft in three axes of rotation. Similarly, rotation and orientation control of propellers may provide lift support (e.g., lift required for vertical take-off, landing, and hovering) and may provide the forward thrust required to move the aircraft through the air. The resilience of each of these flight elements to one or more points of failure (e.g., reception of faulty or erroneous commands) is critical to the safety and stability of the aircraft.

As further detailed below with reference to FIG. 10, a control system for an aircraft (e.g., eVTOL aircraft) may be complex and affect many critical aircraft components, which may be paramount to ensure structural integrity, stability, and safety of the aircraft. By actively managing the control signals sent to aircraft components (e.g., by implementing input validation operations, erroneous command mitigation operations, etc.), one or more points of fault or failure may be properly identified and may be prevented from causing (e.g., commanding) one or more aircraft components and/or the entire aircraft to enter a potentially hazardous or dangerous state.

The disclosed embodiments provide resilience against one or more sources of faults or failures (e.g., faulty flight control computer) by implementing input validation operations, consistent with disclosed embodiments and as exemplified and detailed below with respect to FIGS. 11A, 11B, 11C, and 12. Additionally or alternatively, the disclosed embodiments provide resilience against one or more sources of faults or failures (e.g., faulty flight control computer) by implementing erroneous command mitigation operations, consistent with disclosed embodiments and as exemplified and detailed below with respect to FIGS. 13 and 14.

In some embodiments, an aircraft of any of the disclosed embodiments may be simulated. For example, the aircraft may be in a simulated environment in a simulator (e.g., a simulator for flight training) or a virtual environment in a video game. Additionally or alternatively, in some embodiments, a fault-tolerant multi-processor system of an aircraft may be simulated. For example, the fault-tolerant multi-processor system (e.g., input validation, erroneous command mitigation) may be in a simulated environment in a simulator (e.g., a simulator for flight training) or a virtual environment in a video game. A representation of the fault-tolerant multi-processor system may be displayed on a display device (e.g., monitor, tablet, smartphone, computer screen, or any other display device) operatively connected to a processor configured to execute software code stored in a storage medium for performing flight controls operations, such as those further detailed below with reference to FIGS. 10, 12, and 14.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 2:
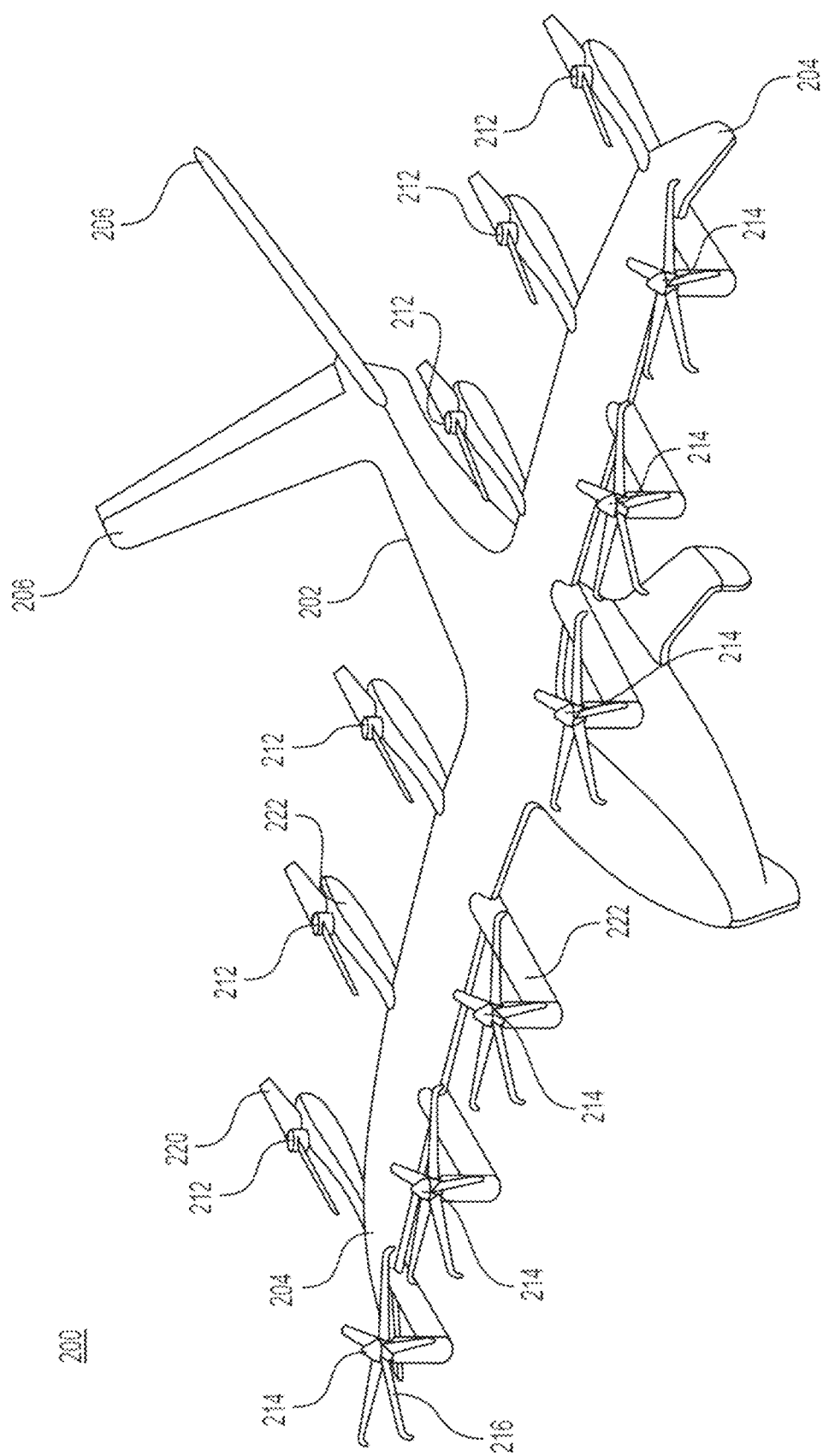
FIG. 2 shows an exemplary VTOL aircraft, consistent with disclosed embodiments.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of the aircrafts 100, 200. The aircraft 100, 200 may include a fuselage 102, 202, wings 104, 204 mounted to the fuselage 102, 202 and one or more rear stabilizers 106, 206 mounted to the rear of the fuselage 102, 202. A plurality of lift propellers 112, 212 may be mounted to wings 104, 204 and may be configured to provide lift for vertical take-off, landing and hover. A plurality of tilt propellers 114, 214 may be mounted to wings 104, 204 and may be tiltable (e.g., configured to tilt or alter orientation) between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. For example, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When the aircraft 100, 200 is in full forward flight, lift may be provided entirely by wings 104, 204. Meanwhile, in the cruise configuration, lift propellers 112, 212 may be shut off. The blades 120, 220 of lift propellers 112, 212 may be held in low-drag positions for aircraft cruising. In some embodiments, lift propellers 112, 212 may each have two blades 120, 220 that may be locked, for example while the aircraft is cruising, in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of the tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 (e.g., rotation point of propeller is behind a wing from a bird's eye view) and at least a portion of tilt propellers 114, 214 may be located forward of wings 104, 204 (e.g., rotation point of propeller is in front of a wing from a bird's eye view). In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—e.g., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps, ailerons, and/or flaperons (e.g., configured to perform functions of both flaps and ailerons). According to some embodiments, wings 104, 204 may have a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design for providing lift, directionality, stability, and/or any other characteristic beneficial for aircraft. In some embodiments, the wings have a tapering leading edge.

In some embodiments, lift propellers 112, 212 or tilt propellers 114, 214 may be canted relative to at least one other lift propeller 112, 212 or tilt propeller 114, 214, where canting refers to a relative orientation of the rotational axis of the lift propeller/tilt propeller about a line that is parallel to the forward-rearward direction, analogous to the roll degree of freedom of the aircraft.

In some embodiments, one or more lift propellers 112, 212 and/or tilt propellers 114, 214 may canted relative to a cabin of the aircraft, such that the rotational axis of the propeller in a lift configuration is angled away from an axis perpendicular to the top surface of the aircraft. For example, in some embodiments, the aircraft is a flying wing aircraft as shown in FIG. 9E below, and some or all of the propellers are canted away from the cabin.

Figure 3:
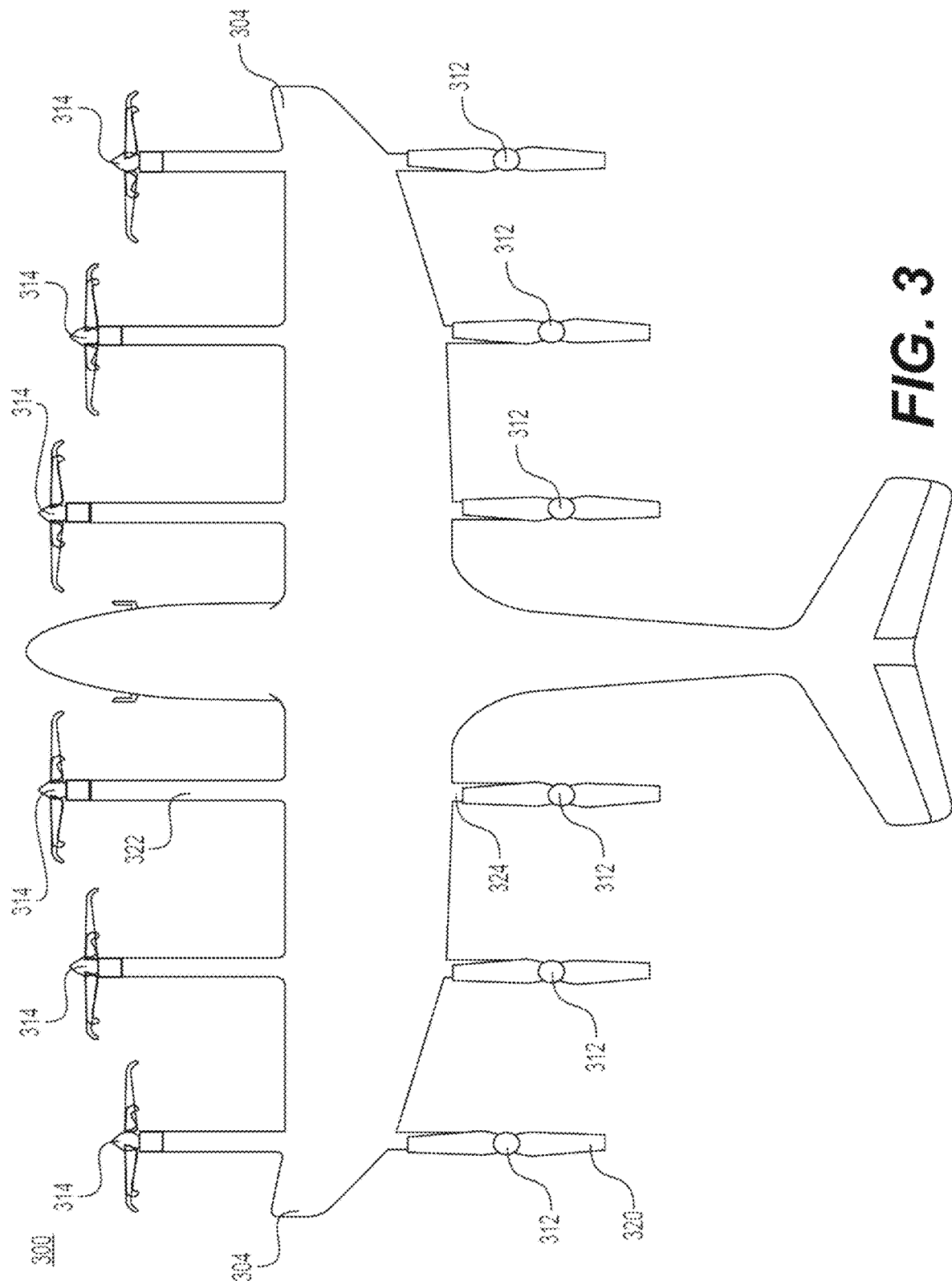
FIG. 3 shows an exemplary top plan view of a VTOL aircraft, consistent with disclosed embodiments.

FIG. 3 is an illustration of a top plan view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of the main wings 304 of the aircraft 300. In some embodiments, forward electric propulsion systems may be mounted to wings 304 by booms 322. In some embodiments, aft electric propulsion systems may be mounted to wings 304 by booms 324. In some embodiments, a length of the rear end of the boom 324 from the wing 304 to a lift propeller (part of electric propulsion system 312) may comprise a similar rear end of the boom 324 length across the numerous rear ends of the booms. In some embodiments, the length of the rear ends of the booms may vary, for example, across the six rear ends of the booms. Further, FIG. 3 depicts an exemplary embodiment of a VTOL aircraft 300 with forward propellers (part of electric propulsion system 314) in a horizontal orientation for horizontal flight and aft propeller blades 320 in a stowed position for a forward phase of flight.

Figure 4:
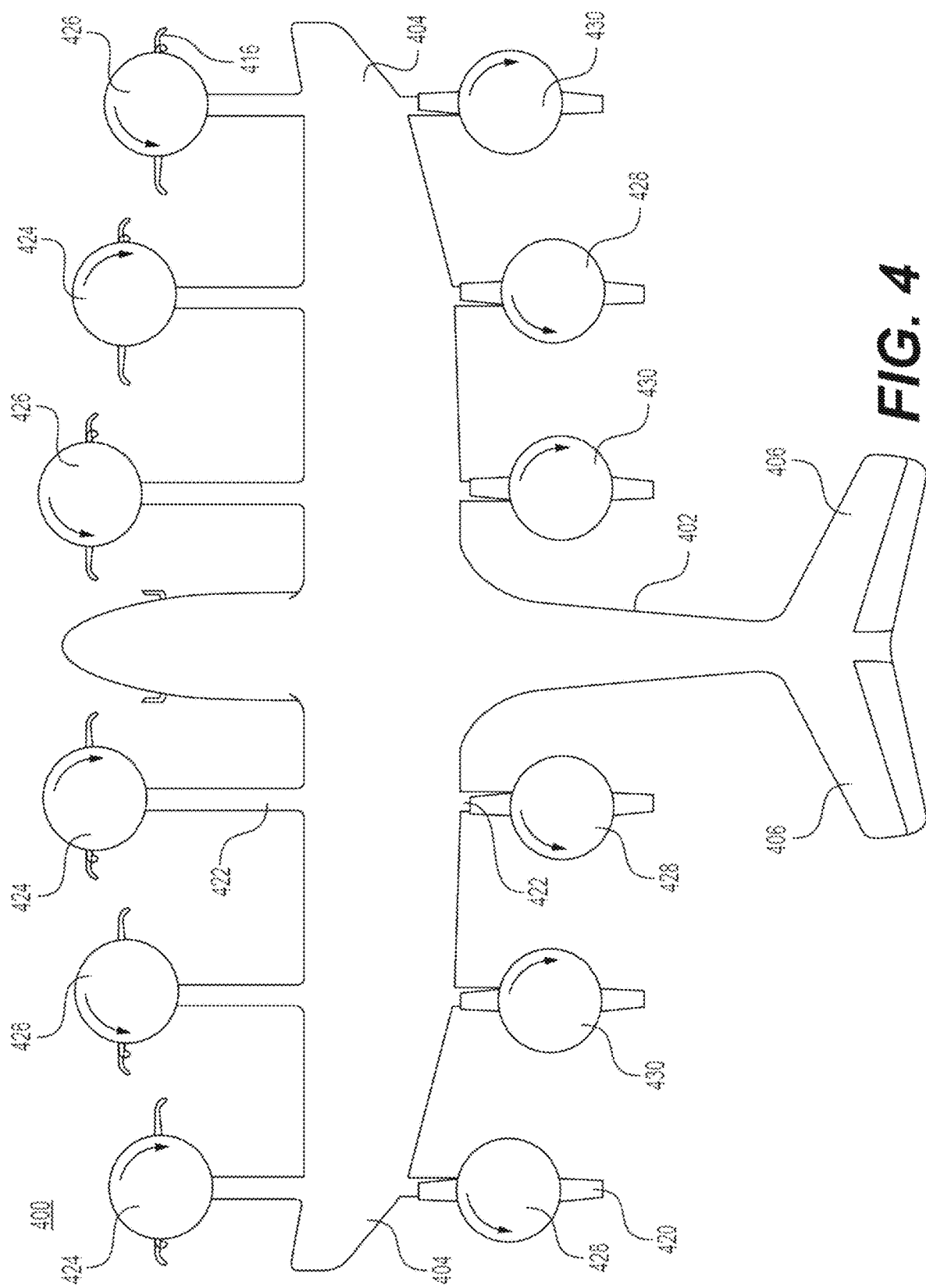
FIG. 4 illustrates exemplary propeller rotation of a VTOL aircraft, consistent with disclosed embodiments.

FIG. 4 is a schematic diagram illustrating exemplary propeller rotation of a VTOL aircraft, consistent with disclosed embodiments. Aircraft 400 shown in the figure may be a top plan view of the aircraft 100, 200, and 300 shown in FIGS. 1, 2, and 3, respectively. An aircraft 400 may include six forward electric propulsion systems with three of the forward electric propulsion systems being of CW type 424 and the remaining three forward electric propulsion systems being of CCW type 426. In some embodiments, three aft electric propulsion systems may be of CCW type 428 with the remaining three aft electric propulsion systems being of CW type 430. Some embodiments may include an aircraft 400 possessing four forward electric propulsion systems and four aft electric propulsion systems, each with two CW types and two CCW types. In some embodiments, aircraft 400 may include a fuselage 402, wing(s) 404 mounted to the fuselage 402, and one or more rear stabilizers 406 mounted to the rear of the fuselage 402. In some embodiments, each forward electric propulsion system may include propeller blades 416. In some embodiments, each aft electric propulsion system may include propeller blades 420. In some embodiments, electric propulsion systems may be mounted to wing(s) 404 by booms 422. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 400 possessing forward and aft electric propulsion systems where the amount of CW types 424 and CCW types 426 is not equal among the forward electric propulsion systems, among the aft electric propulsion systems, or among the forward and aft electric propulsion systems.

Figure 5:
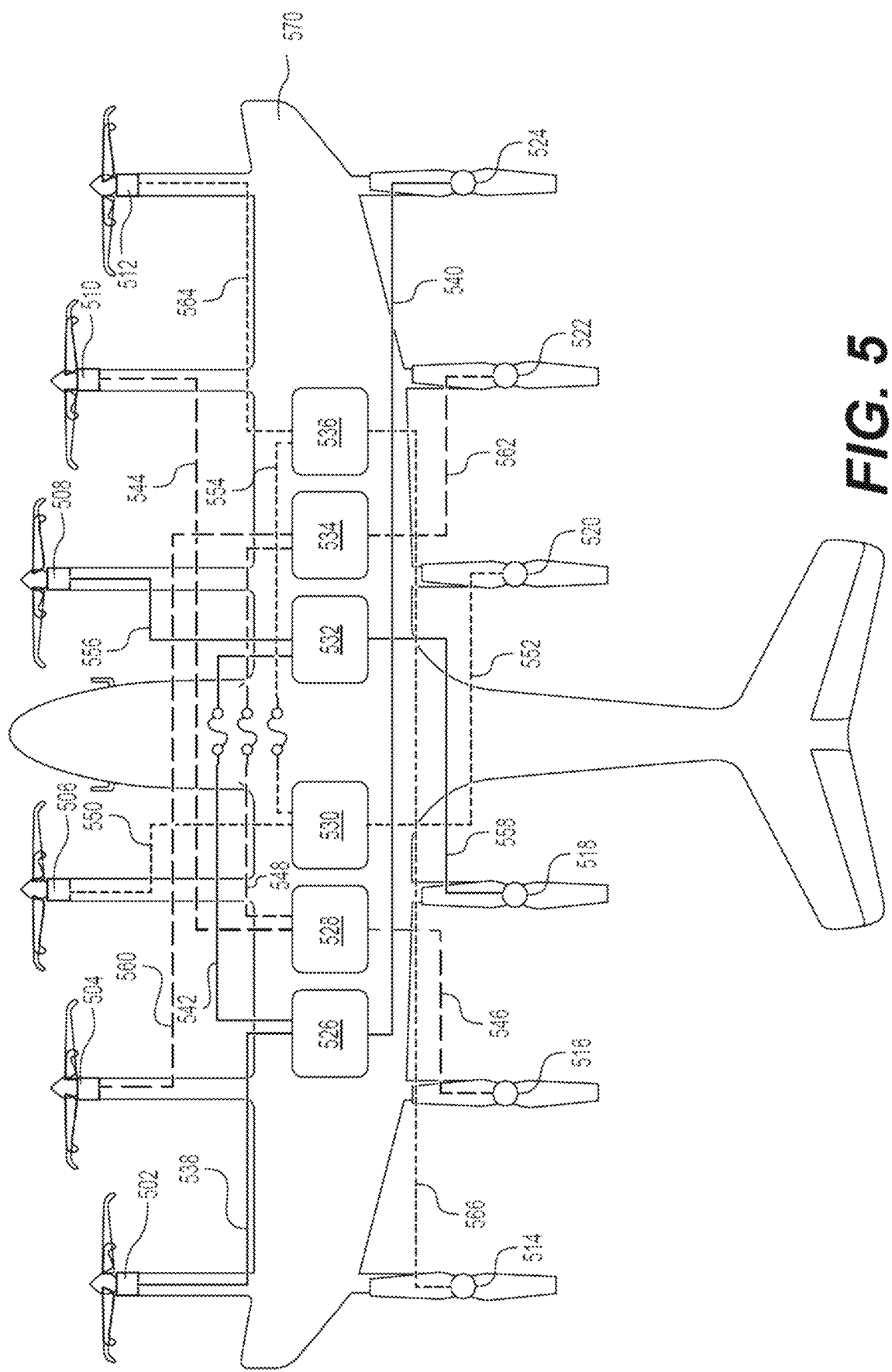
FIG. 5 shows exemplary power connections in a VTOL aircraft, consistent with disclosed embodiments.

FIG. 5 is a schematic diagram illustrating exemplary power connections in a VTOL aircraft, consistent with disclosed embodiments. A VTOL aircraft may have multiple power systems connected to diagonally opposing electric propulsion systems. In some embodiments, the power systems may include high voltage power systems. Some embodiments may include high voltage power systems connected to electric engines via high voltage channels. In some embodiments, an aircraft 500 may include six power systems (e.g., battery packs), including power systems 526, 528, 530, 532, 534, and 536 stored within the wing 570 of the aircraft 500. The power systems may power electric propulsion systems and/or other electric components of the aircraft 500. In some embodiments, the aircraft 500 may include six forward electric propulsion systems having six electric engines 502, 504, 506, 508, 510, and 512 and six aft electric propulsion systems having six electric engines 514, 516, 518, 520, 522, and 524. In some embodiments, one or more power systems (e.g., battery packs) may include a battery management system ("BMS") (e.g., one BMS for each battery pack). While six power systems are shown in FIG. 5, the aircraft 500 may include any number and/or configuration of power systems.

Figure 6:
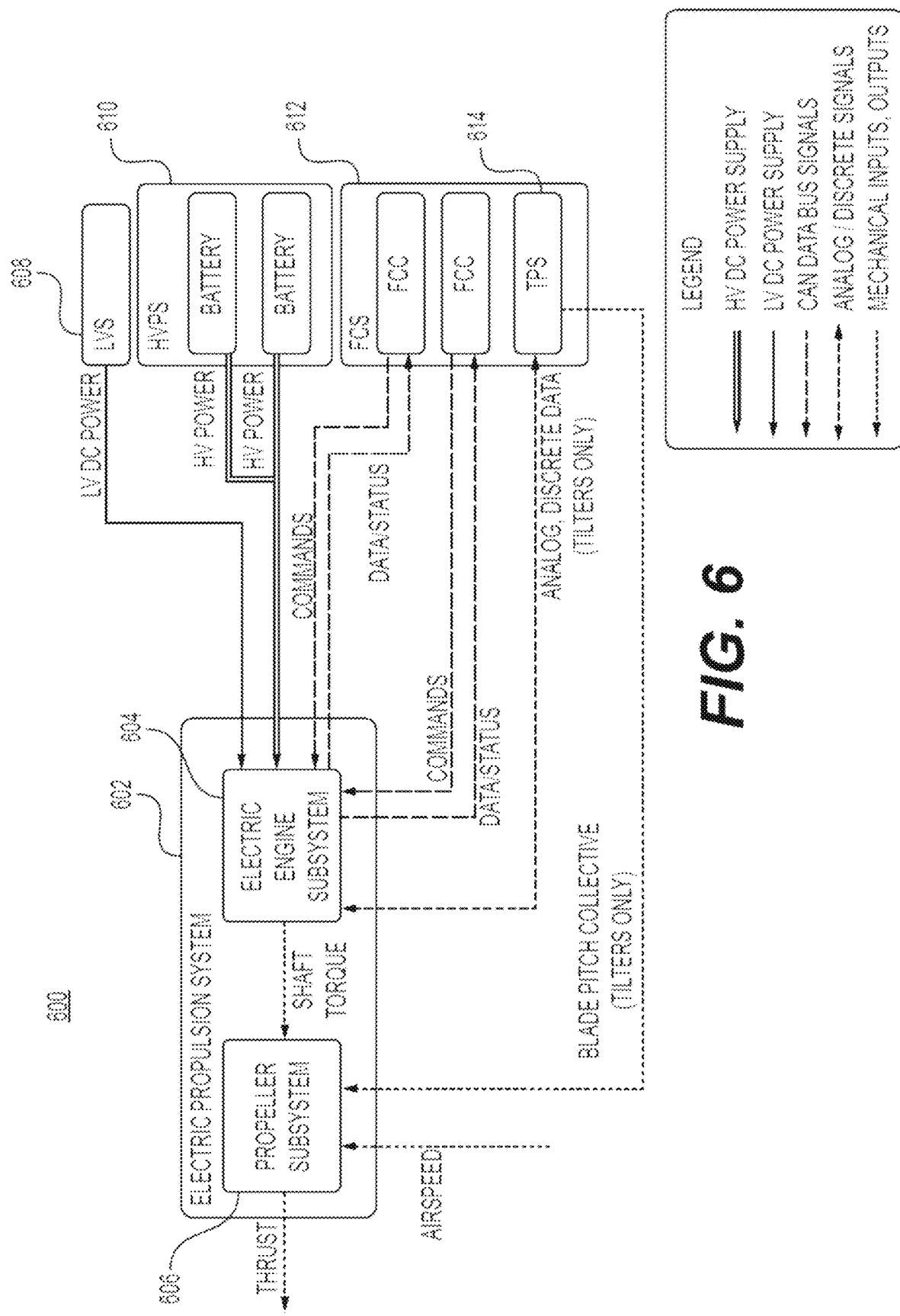
FIG. 6 shows an exemplary architecture of an electric propulsion unit, consistent with disclosed embodiments.

In some embodiments, the one or more battery management systems may communicate with a Flight Control System ("FCS") of the aircraft (e.g., FCS 612 shown in FIG. 6). For example, the FCS may monitor the status of one or more battery packs and/or provide commands to the one or more battery management systems which make corresponding adjustments to the high voltage power supply.

FIG. 6 illustrates block diagram of an exemplary architecture and design of an electric propulsion unit 600 consistent with disclosed embodiments. Exemplary electric propulsion unit 600 includes an electric propulsion system 602, which may be configured to control aircraft propellers. Electric propulsion system 602 may include an electric engine subsystem 604 that may supply torque, via a shaft, to a propeller subsystem 606 to produce the thrust of the electric propulsion system 602. Some embodiments may include the electric engine subsystem 604 receiving low voltage direct current (LV DC) power from a Low Voltage System (LVS) 608. In some embodiments, the electric engine subsystem 604 may be configured to receive high voltage (HV) power from a High Voltage Power System (HVPS) 610 comprising at least one battery or other device capable of storing energy. HV power may refer to power that is higher or greater in voltage than voltage provided by Low Voltage System (LVS) 608.

Some embodiments may include an electric propulsion system 602 including an electric engine subsystem 604 receiving signals from and sending signals to a flight control system 612. In some embodiments, a flight control system (FCS) 612 may comprise a flight control computer (FCC) capable of using Controller Area Network ("CAN") data bus signals to send commands to the electric engine subsystem 604 and receive status and data from the electric engine subsystem 604. An FCC may include a device configured to perform one or more operations (e.g., computational operations) for an aircraft, such as at least one processor and a memory component, which may store instructions executable by the at least one processor to perform the operations, consistent with disclosed embodiments. It should be understood that while CAN data bus signals are used between the flight control computer and the electric engine(s), some embodiments may include any form of communication with the ability to send and receive data from a flight control computer to an electric engine. Some embodiments may include electric engine subsystems 604 capable of receiving operating parameters from and communicating operating parameters to an FCC in FCS 612, including speed, voltage, current, torque, temperature, vibration, propeller position, and/or any other value of operating parameters.

In some embodiments, a flight control system 612 may also include a Tilt Propeller System ("TPS") 614 capable of sending and receiving analog, discrete data to and from the electric engine subsystem 604 of the tilt propellers. A tilt propeller system (TPS) 614 may include an apparatus capable of communicating operating parameters to an electric engine subsystem 604 and articulating an orientation of the propeller subsystem 606 to redirect the thrust of the tilt propellers during various phases of flight using mechanical means such as a gearbox assembly, linear actuators, and any other configuration of components to alter an orientation of the propeller subsystem 606. In some embodiments, electric engine subsystem may communicate an orientation of the propeller system (e.g., an angle between lift and forward thrust) to TPS 614 and/or FCS 612 (e.g., during flight).

Figure 7:
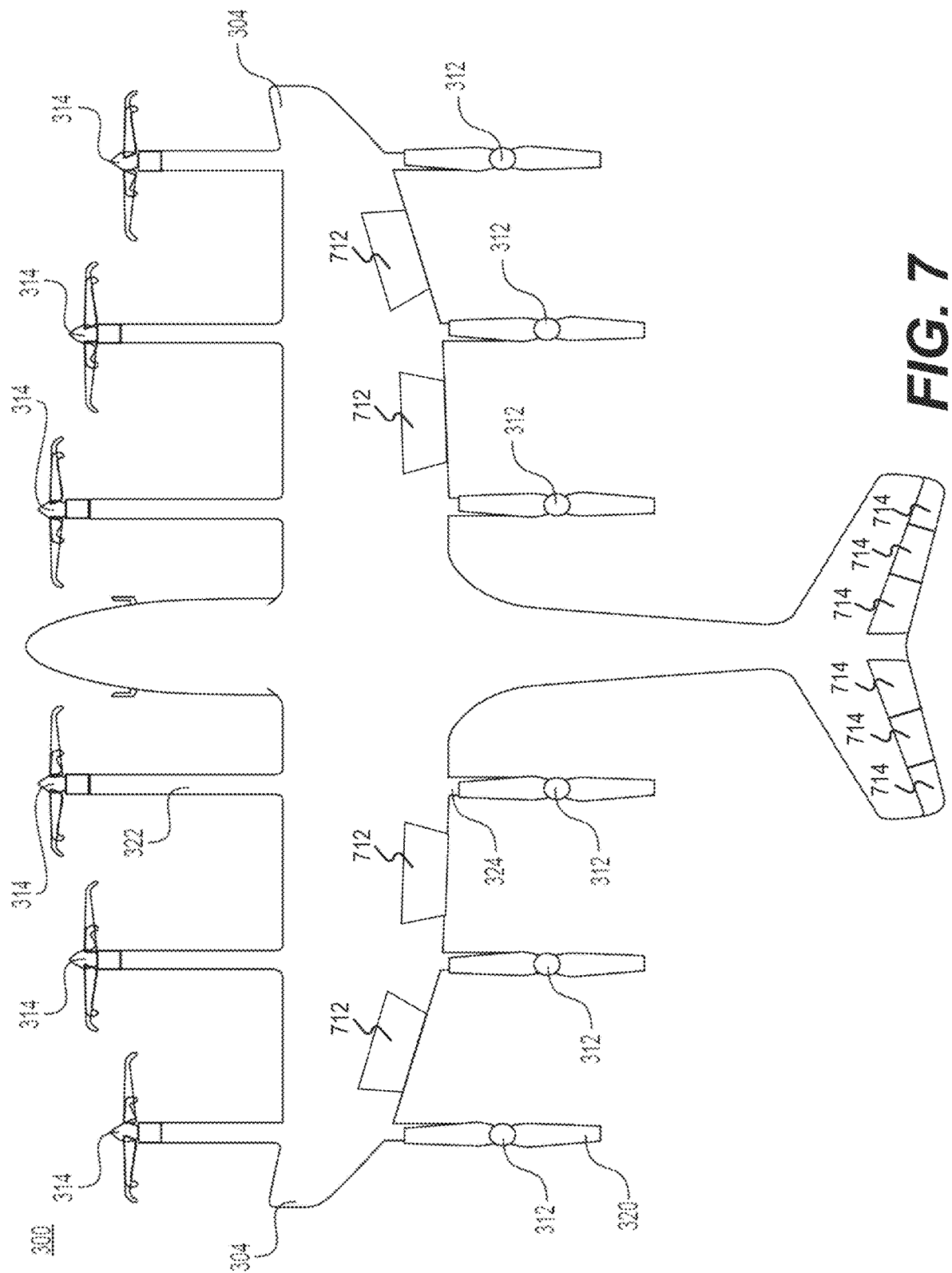
FIG. 7 shows an exemplary top plan view of a VTOL aircraft, consistent with disclosed embodiments.

In some embodiments, a flight control system may include a system capable of controlling control surfaces and their associated actuators in an exemplary VTOL aircraft. FIG. 7 is an illustration of a top plan view of an exemplary VTOL aircraft, consistent with embodiments of the present disclosure. Aircraft 700 shown in the figure may be a top plan view of the aircraft 100, 200 shown in FIGS. 1 and 2, respectively, in addition to the aircraft components described above with reference to FIG. 3. In aircraft 700, the control surfaces may include, in addition to the propeller blades discussed earlier, flaperons 712 and ruddervators 714. Flaperons 712 may combine functions of one or more flaps, one or more ailerons, and/or one or more spoilers. Ruddervators 714 may combine functions or one or more rudders and/or one or more elevators. Additionally or alternatively, control surfaces may include separate rudders and elevators. In aircraft 700, the actuators may include, in addition to the electric propulsion systems discussed earlier, control surface actuators (CSAs) associated with flaperons 712 and ruddervators 714, as discussed further below with reference to FIG. 8.

Figure 8:
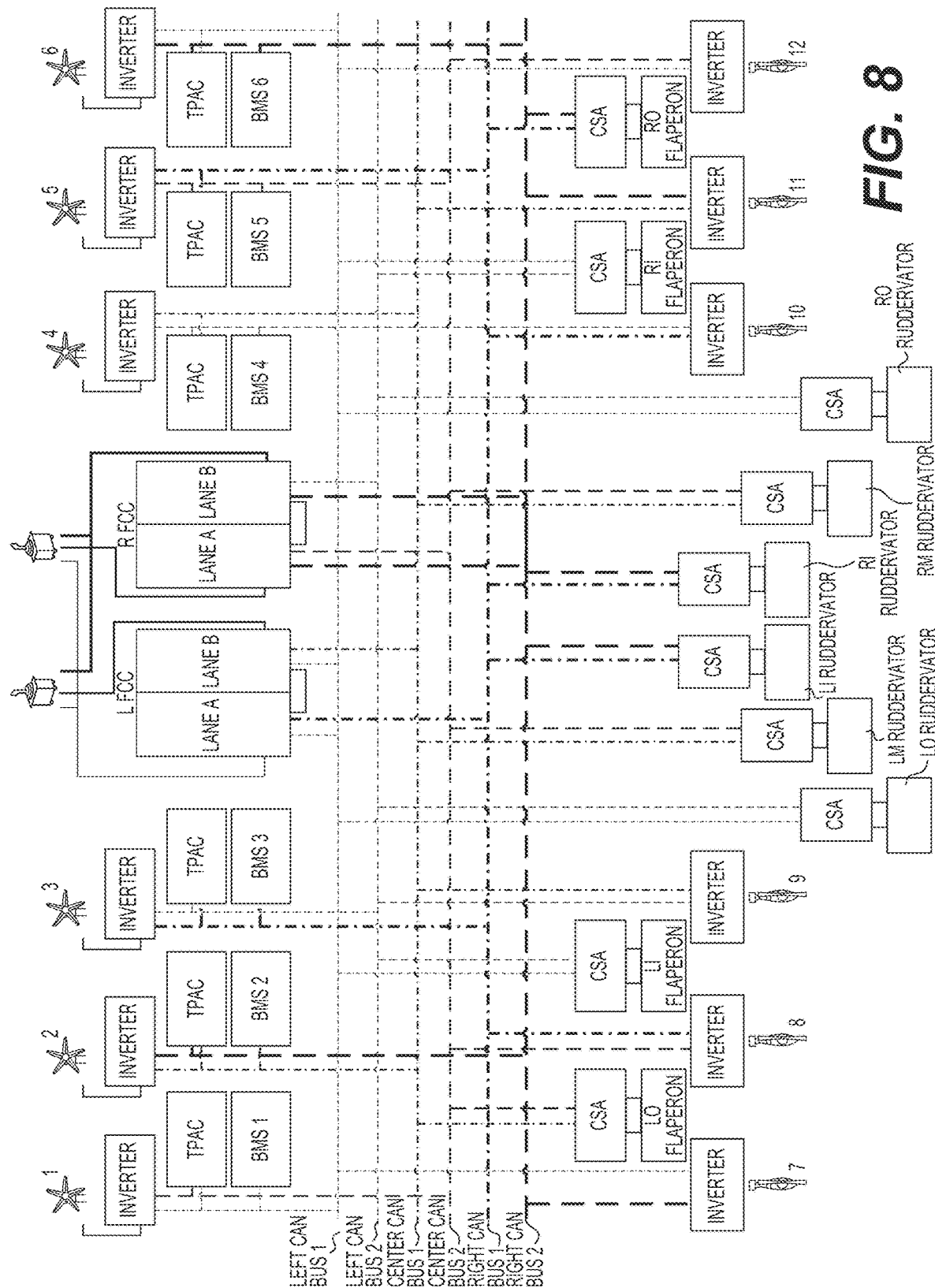
FIG. 8 shows an exemplary flight control signaling architecture, consistent with disclosed embodiments.

FIG. 8 illustrates a flight control signaling architecture for controlling the control surfaces and associated actuators, according to various embodiments. Although FIG. 7 illustrates twelve EPU inverters and associated propeller blades, six tilt propeller actuators (TPACs), six battery management systems (BMSs), four flaperons and associated control surface actuators (CSAs), and six ruddervators and associated CSAs, aircraft according to various embodiments can have any suitable number of these various elements. As shown in FIG. 8, control surfaces and actuators may be controlled by a combination of four flight control computers (FCCs)-Left FCC, Lane A (L FCC-A), Left FCC, Lane B (L FCC-B), Right FCC, Lane A (R FCC-A), and Right FCC, Lane A (R FCC-B), although any other suitable number of FCCs may be utilized. The FCCs may each individually control all control surfaces and actuators or may do so in any combination with each other. In some embodiments, each FCC may include one or more hardware computing processors. In some embodiments, each FCC may utilize a single-threaded computing process or a multi-threaded computing process to perform the computations required to control the control surfaces and actuators. In some embodiments, all computing processes required to control the control surfaces and actuators may be performed on a single computing thread by a single flight control computer.

The FCCs may provide control signals to the control surface actuators, including the EPU inverters, TPACs, BMSs, flaperon CSAs, and ruddervator CSAs, via one or more bus systems. For different control surface actuators, the FCC may provide control signals, such as voltage or current control signals, and control information may be encoded in the control signals in binary, digital, or analog form. In some embodiments, the bus systems may each be a CAN bus system, e.g., Left CAN bus 1, Left CAN bus 2, Right CAN bus 1, Right CAN bus 2, Center CAN bus 1, Center CAN bus 2 (see FIG. 8). In some embodiments, multiple FCCs may be configured to provide control signals via each CAN bus system, and each FCC may be configured to provide control signals via multiple CAN bus systems. In the exemplary architecture illustrated in FIG. 8, for example, L FCC-A may provide control signals via Left CAN bus 1 and Right CAN bus 1, L FCC-B may provide control signals via Left CAN bus 1 and Center CAN bus 1, R FCC-A may provide control signals via Center CAN bus 2 and Right CAN bus 2, and R FCC-B may provide control signals via Left CAN bus 2 and Right CAN bus 2.

FIGS. 9A-9F are illustrations of a top plan view of exemplary VTOL aircrafts, consistent with embodiments of the present disclosure. There may be a number of design considerations (cost, weight, size, performance capability etc.) that may influence the number and/or combination of tilt and lift propellers in a VTOL aircraft. As further described below, the number and orientation of propellers (and other effectors or actuators) may affect how safety-critical the generation and propagation of intended or correct commands to each flight component are. Therefore, the flight control system may implement multi-processor fault-tolerant systems and methods (e.g., those discussed in disclosed embodiments) to control the aircraft in a manner that reduces (e.g., minimizes, eliminates) risk of aircraft components receiving and acting upon faulty commands.

FIG. 9A illustrates an arrangement of electric propulsion units, consistent with embodiments of the present disclosure. Referring to FIG. 9A, the aircraft shown in the figure may be a top plan view of an exemplary aircraft (e.g., a VTOL aircraft). The aircraft may include twelve electric propulsion systems distributed across the aircraft. In some embodiments, a distribution of electric propulsion systems may include six forward electric propulsion systems (901, 902, 903, 904, 905, and 906) and six aft electric propulsion systems (907, 908, 909, 910, 911, and 912). In some embodiments, the six forward electric propulsion systems may be operatively connected to tilt propellers and the six aft electric propulsion systems may be operatively connected to lift propellers. In other embodiments, the six forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9B illustrates an alternate arrangement of electric propulsion units, consistent with embodiments of the present disclosure. Referring to FIG. 9B, the aircraft shown in the figure may be a top plan view of an exemplary aircraft (e.g., a VTOL aircraft). The aircraft may include eight electric propulsion systems distributed across the aircraft. In some embodiments, a distribution of electric propulsion systems may include four forward electric propulsion systems (913, 914, 915, and 916) and four aft electric propulsion systems (917, 918, 919, and 920). In some embodiments, the four forward electric propulsion systems may be operatively connected to tilt propellers and the four aft electric propulsion systems may be operatively connected to lift propellers. In other embodiments, the four forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9C illustrates an alternate arrangement of electric propulsion units, consistent with embodiments of the present disclosure. Referring to FIG. 9C, the aircraft shown in the figure may be a top plan view of an exemplary aircraft (e.g., a VTOL aircraft). The aircraft may include six electric propulsion systems distributed across the aircraft. In some embodiments, a distribution of electric propulsion systems may include a first set of four electric propulsion systems 921, 922, 923, and 924 coplanar in a first plane and a second set of two electric propulsion systems 925 and 926 coplanar in a second plane. In some embodiments, the first set of electric propulsion systems 921-924 may be operatively connected to tilt propellers and second set of electric propulsion systems 925 and 926 may be operatively connected to lift propellers. In other embodiments, the first set of electric propulsion systems 921-924 and the second set of aft electric propulsion systems 925 and 926 may all be operatively connected to tilt propellers.

FIG. 9D illustrates an alternate arrangement of electric propulsion units, consistent with embodiments of the present disclosure. Referring to FIG. 9D, the aircraft shown in the figure may be a top plan view of an exemplary aircraft (e.g., a VTOL aircraft). The aircraft may include four electric propulsion systems distributed across the aircraft. In some embodiments, a distribution of electric propulsion systems may include four coplanar electric propulsion systems 927, 928, 929, and 930. In some embodiments, all of the electric propulsion systems may be operatively connected to tilt propellers.

FIG. 9E illustrates an alternate arrangement of electric propulsion units, consistent with embodiments of the present disclosure. Referring to FIG. 9E, the aircraft shown in the figure may be a top plan view of an exemplary aircraft (e.g., a VTOL aircraft). The aircraft may include six electric propulsion systems distributed across the aircraft. For example, in some embodiments, the aircraft may include four forward electric propulsion systems 931, 932, 933, and 934 operatively connected to tilt propellers and the two aft ducted fans 935 and 936 operatively connected to lift propellers. In some embodiments, the aircraft may include ten electric propulsion systems distributed across the aircraft. For example, in some embodiments, the aircraft may include six forward electric propulsion systems operatively connected to tilt propellers and the four aft electric propulsion systems operatively connected to lift propellers. In some embodiments, some or all of the aft electric propulsion systems may operatively connected to tilt propellers.

As shown in FIG. 9E, in some embodiments, the aircraft may have a flying wing configuration, such as a tailless fixed-wing aircraft with no definite fuselage. In some embodiments, the aircraft may have a flying wing configuration with the fuselage integrated into the wing. In some embodiments, the tilt propellers may rotate in a plane above the body of the aircraft when the tilt propellers operate in a lift configuration.

FIG. 9F illustrates an alternate arrangement of electric propulsion units, consistent with the embodiments of the present disclosure. Referring to FIG. 9F, the aircraft may be a top plan view of an exemplary aircraft. In some embodiments, the aircraft may include ducted fans 937, 938, 939, and 940 operably connected to the electric propulsion systems. In some embodiments the aircraft may include a bank of ducted fans on each wing of the aircraft and the bank of ducted fans may be connected to tilt together (e.g., between lift and forward thrust configuration). In some embodiments the aircraft includes a left and right front wing and a left and right rear wing. In some embodiments, each wing of the aircraft includes a bank of connected ducted fans. In some embodiments, each bank of connected ducted fans are tiltable (e.g., between lift and forward thrust), while in other embodiments only the bank of fans on the front wing(s) are tiltable.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems. In some embodiments, each electric propulsion systems may be fixed as clockwise (CW) type or counterclockwise (CCW) type, while in other embodiments, one or more electric propulsion systems may vary between clockwise (CW) and counterclockwise (CCW) rotation.

Figure 10:
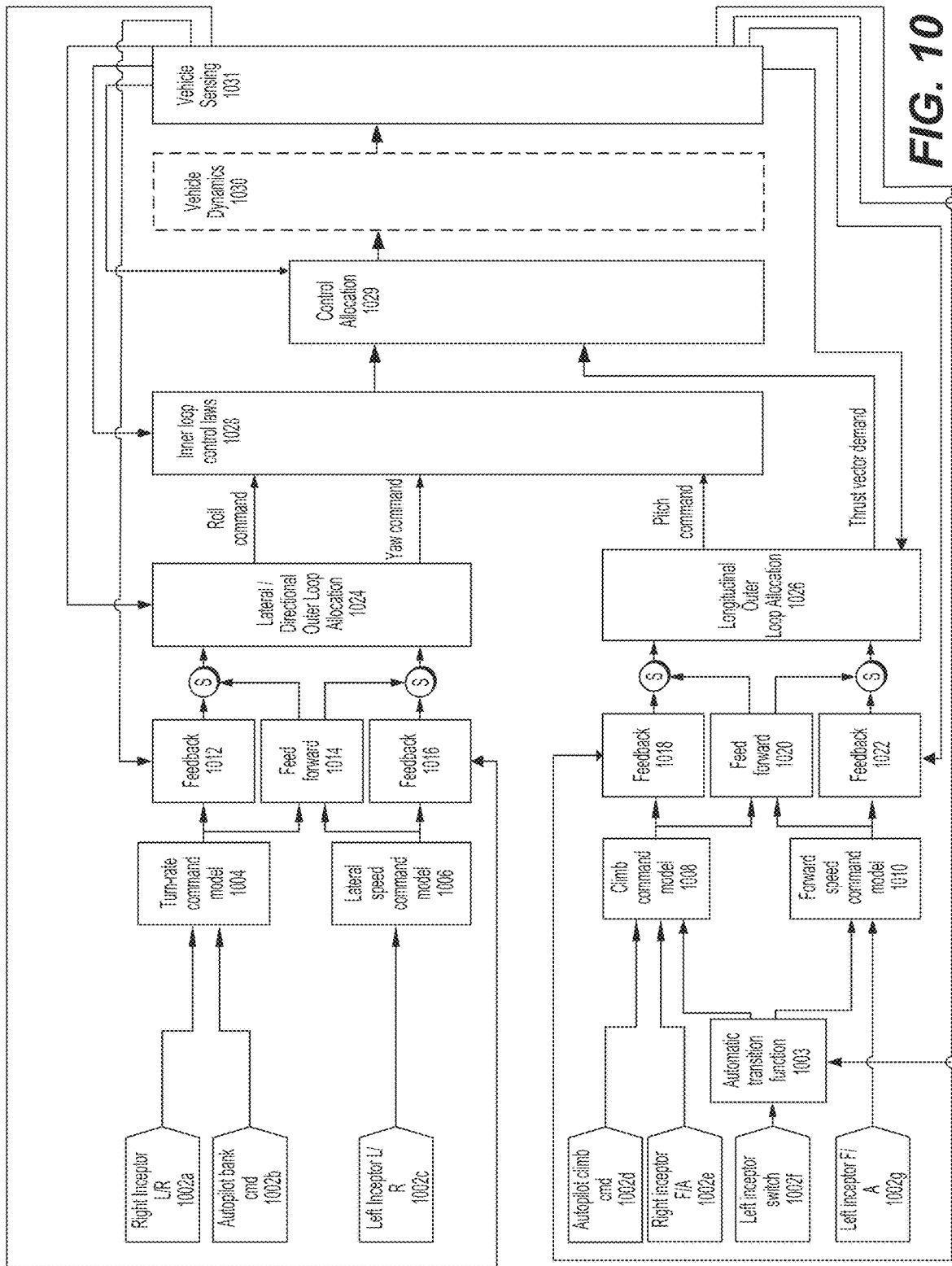
FIG. 10 illustrates a functional block diagram of an exemplary control system of an electric VTOL aircraft, consistent with disclosed embodiments.

FIG. 10 illustrates a functional block diagram of an exemplary control system 1000 of an aircraft, consistent with disclosed embodiments. System 1000 may be implemented by at least one processor (e.g., at least one a microprocessor-based controller) configured to execute software code stored in a storage medium (e.g., a computer-readable medium, a non-transitory computer-readable medium) to implement the functions described herein. System 1000 may also be implemented in hardware, or a combination of hardware and software. System 1000 may be implemented as part of a flight control system of the aircraft (e.g., part of FCS 612 in FIG. 6) and may be configured to perform a single step or sequence repeatedly until a desired or commanded outcome is achieved. It is to be understood that many conventional functions of the control system are not shown in FIG. 10 for ease of description. System 1000 further includes one or more storage mediums storing model(s), function(s), table(s), and/or any information for executing the disclosed processes. As further described below, any or each box indicating a command model (e.g., 1004, 1006, 1008, and 1010), feedback (1012, 1016, 1018, and 1022), feed forward (1014, 1020), Outer Loop Allocation (1024, 1026), inner loop control laws 1028, and control allocation 1029 may represent or include module(s), script(s), function(s), application(s), and/or program(s) that are executed by processor(s) and/or microprocessor(s) of system 1000. It is appreciated that the complexity and interconnectedness of the functional block diagram of FIG. 10 would be impossible, or at least impractical, to effectively implement by a human user, especially when considering that these functionalities are implemented while the aircraft is flying (including taking off or landing).

In some embodiments, control system 1000 may be configured based on one or more flight control laws. Flight control law may comprise a set of algorithms, models, and/or rules configured to govern a behavior of an aircraft (e.g., control or influence one or more effectors of the aircraft) in response to one or more pilot inputs and external factors. In some embodiments, flight control laws may be configured to achieve at least one of desired flight characteristics, stability, or performance. For example, flight control laws may be configured to ensure stability and controllability of an aircraft by controlling how the aircraft responds to at least one of one or more pilot inputs, vehicle dynamics (e.g., disturbances, such as turbulence, gusts, etc.), or changes in flight conditions (e.g., altitude, airspeed, angle of attack).

System 1000 may detect one or more inputs, such as from a pilot input device configured to receive at least one pilot input and generate or influence a signal. A pilot input may be generated by and/or received from an input device or mechanism of the aircraft, such as a button, a switch, a stick, a slider, an inceptor, or any other device configured to generate or influence a signal based on a physical action from a pilot. For example, a pilot input device may include one or more of right inceptor(s) (e.g., moving right inceptor left/right 1002a and/or right inceptor forward/aft 1002c), left inceptor(s) (e.g., moving left inceptor left/right 1002c and/or left inceptor forward/aft 1002g), and/or left inceptor switch 1002f. In some embodiments, a pilot input device may include an interface with an autopilot system (e.g., display screen(s), switch(es), button(s), lever(s), and/or other interface(s)). Optionally, system 1000 may further detect inputs from an autopilot system, such as autopilot roll command 1002b, autopilot climb command 1002d, and/or other command(s) to control the aircraft. In some embodiments, one or more of these commands may be used for one or more procedures (e.g., consensus determination, erroneous command determination), such as those described below with respect to FIGS. 11A-15.

In some embodiments, the one or more inputs may include at least one of a position and/or rate of a right inceptor and/or a left inceptor, signals received (e.g., response type change commands, trim inputs, reference inputs, backup control inputs, etc.) from switches on the inceptors, measurements of aircraft state and environmental conditions (e.g., measured load factor, airspeed, roll angle, pitch angle, actuator states, battery states, aerodynamic parameters, temperature, gusts, etc.) based on data received from one or more sensors of the aircraft, obstacles (e.g., presence or absence of other aircraft and/or debris), and an aircraft mode (e.g., taxiing on the ground, takeoff, in-air). For example, right inceptor L/R 1002a may comprise a lateral position and/or rate of a right inceptor (e.g., an inceptor positioned to the right of another inceptor and/or an inceptor positioned on the right side of a pilot area), autopilot roll command 1002b may comprise a roll signal received in autopilot mode, left inceptor L/R 1002c may comprise a lateral position and/or rate of a left inceptor (e.g., an inceptor positioned to the left of another inceptor and/or an inceptor positioned on the left side of a pilot area), autopilot climb command 1002d may comprise a climb signal received in autopilot mode, right inceptor F/A 1002e may comprise a longitudinal position and/or rate of the right inceptor, left inceptor switch 1002f may comprise a signal from a switch for enabling or disabling automatic transition function 1003, and left inceptor F/A 1002g may comprise a longitudinal position and/or rate of the left inceptor.

Each input may include data as listed above (e.g., signals from switches, measurements of aircraft state, aircraft mode, etc.). Actuator states may include actuator hardware limits, such as travel limits, speed limits, response time limits, etc., and can include actuator health indicators that may indicate deteriorations in actuator performance that may limit a given actuator's ability to satisfy actuator commands. Actuator states may be used to determine the bounds (e.g., minimum/maximum values) for individual actuator commands. Battery states may correspond to remaining energy of the battery packs of the aircraft, which may be monitored when control allocation 1029 considers balancing battery pack energy states. Aerodynamic parameters may be parameters derived from aerodynamic and acoustic modeling and can be based on the actuator Jacobian matrices and actuator states. Each input received from an inceptor may indicate a corresponding adjustment to an aircraft's heading or power output.

Command models 1004, 1006, 1008 and 1010 may be configured to determine a shape (e.g., aggressiveness, slew rate, damping, overshoot, etc.) of an ideal aircraft response. For example, each command model of command models 1004, 1006, 1008 and 1010 may be configured to receive and interpret at least one of inputs 1002a, 1002b, 1002c, 1002d, 1002e, 1002f and 1002g and, in response, compute a corresponding change to an aircraft's orientation, heading, and propulsion, or a combination thereof using an integrator (not pictured). In some embodiments, right inceptor L/R 1002*a* and autopilot roll command 1002*b* may be fed into turn-rate command model 1004, left inceptor L/R 1002*c* may be fed into lateral speed command model 1006, autopilot climb command 1002*d* and right inceptor F/A 1002*e* may be fed into climb command model 1008, and left inceptor F/A 1002*g* may be fed into forward speed command model 1010. In some embodiments, an output from automatic transition function 1003 may be fed into at least one of climb command model 1008 or forward speed command model 1010. For example, based on receiving an enable signal from left inceptor switch 1002*f*, automatic transition function 1003 may automatically determine at least one of a climb signal or a forward speed signal for transmission to at least one of climb command model 1008 or forward speed command model 1010.

Turn-rate command model 1004 may be configured to output a desired position and/or turn-rate command and may also be configured to compute a desired heading of the aircraft to be assumed when the inceptor is brought back to a centered position (e.g., in detent). Lateral speed command model 1006 may be configured to output a desired position and/or lateral speed command. Climb command model 1008 may be configured to output at least one of a desired altitude, vertical speed, or vertical acceleration command. Forward speed command model 1010 may be configured to output at least one of a desired position, longitudinal speed, or longitudinal acceleration command. In some embodiments, one or more of the command models may be configured to output an acceleration generated in response to changes in speed command. For example, climb command model 1008 may be configured to output a vertical acceleration generated in response to a change in vertical speed command.

Feed forward 1014 and 1020 may each receive as input one or more desired changes (e.g., desired position, speed and/or acceleration) from corresponding command models 1004, 1006, 1008 or 1010 as well as data received from the one or more aircraft sensors (e.g., airspeed, vehicle orientation, vehicle load factor, measured acceleration, vehicle mass and inertia, air density, altitude, aircraft mode, etc.) and may be configured to output, for each desired change, a corresponding force to accomplish the desired change. In some embodiments, feed forward 1014 and 1020 may be configured to determine the corresponding force using simplified models of aircraft dynamics. For example, based on a known (e.g., a stored value of) or determined mass of the aircraft, feed forward 1014 and 1020 may be configured to determine a force to cause the aircraft to follow a desired acceleration command. In some embodiments, feed forward 1014 and 1020 may be configured to use a model predicting an amount of drag on the vehicle produced as a function of speed in order to determine a force required to follow a desired speed command signal.

Feedback 1012, 1016, 1018, and 1022 may each receive as input the one or more desired changes (e.g., desired position, speed and/or acceleration) from command models 1004, 1006, 1008 and 1010 as well as data received from Vehicle Sensing 1031 indicative of Vehicle Dynamics 1030. For example, sensed Vehicle Dynamics 1030 may comprise the physics and/or natural dynamics of the aircraft, and Vehicle Sensing 1031 sensor measurements may capture how the aircraft moves in response to pilot inputs, propulsion system outputs or ambient conditions. In some embodiments, output from Vehicle Sensing 1031 may be used for one or more procedures (e.g., consensus determination, erroneous command determination), such as those described below with respect to FIGS. 11A-15. In some embodiments, Vehicle Dynamics 1030 may represent the control of different flight elements (e.g., electric propulsion system(s) and/or control surfaces) and the corresponding effect on the flight elements and aircraft dynamics. Additionally or alternatively, data received from Vehicle Sensing 1031 may include error signals generated, by one or more processors, based on exogenous disturbances (e.g., gust causing speed disturbance). In some embodiments, feedback 1012, 1016, 1018 and 1022 may be configured to generate feedback forces (e.g., at an actuator) based on the received error signals. For example, feedback 1012, 1016, 1018 and 1022 may generate feedback forces with the intent of counteracting the effect(s) of external disturbances. Additionally or alternatively, feedback 1012, 1016, 1018 and 1022 may be configured to generate feedback forces based on modeling errors. For example, if an incorrect aircraft mass is input into either feed forward 1014 or 1020, the aircraft may accelerate faster or slower than the desired change. Based on determining a difference between the desired acceleration and the measured acceleration, one or more processors may generate an error signal (e.g., included in Vehicle Sensing 1031) which may be looped into feedback 1012, 1016, 1018 or 1022 to determine an additional force needed to correct the error.

In some embodiments, feedback 1012, 1016, 1018 or 1022 may be disabled. For example, in response to losing position and/or ground speed feedback due to disruption of global position system (GPS) communication, system 1000 may be configured to operate without feedback 1012, 1016, 1018 or 1022 until GPS communication is reconnected.

In some embodiments, feedback 1012, 1016, 1018 or 1022 may receive as input a plurality of measurements as well as a trust value for each measurement indicating whether the measurement is valid. For example, one or more processors of system 1000 may assign a Boolean (true/false) value for each measurement used in system 1000 to indicate that the measurement is trustworthy (e.g., yes) or that the measurement may be invalid (e.g., no). Based on one or more processors identifying a measurement as invalid, feedback 1012, 1016, 1018 or 1022 may omit that measurement for further processing. For example, in response to one or more processors identifying a heading measurement as invalid, feedback 1012, 1016, 1018 or 1022 may omit subsequent heading measurements in determining feedback force(s).

In some embodiments, feedback 1012, 1016, 1018 or 1022 may determine one or more feedback forces based on actuator state information received from one or more sensors (e.g., included in Vehicle Sensing 1031). For example, in response to actuator state information indicating that there is a failure of an actuator, one or more processors of system 1000 may update one or more processes of System 1000 and determine an alternative command to achieve the desired change. For example, one or more processors of system 1000 may adjust one or more model(s), function(s), algorithm(s), table(s), input(s), parameter(s), threshold(s), and/or constraint(s) based on (e.g., in response to) a change in state (e.g., failure) of an actuator (or other aircraft component, such as an engine or battery, for other examples). Alternative command(s) (e.g., yaw, pitch, roll, thrust, or torque) may be determined based on the adjustment(s). Additionally or alternatively, in response to actuator state information indicating that one or more actuators are at a maximum value, one or more processors of system 1000 may update one or more processes of system 1000 (e.g., as described above) and determine an alternative command to achieve the desired change.

Total desired forces may be calculated based on outputs of feedback 1012, 1016, 1018 and 1022 and feed forward 1014 and 1020. For example, one or more processors of system 1000 may calculate a desired turn-rate force by summing the outputs of feedback 1012 and feed forward 1014. Additionally or alternatively, one or more processors of system 1000 may calculate a desired lateral force by summing the outputs of feedback 1016 and feed forward 1014. Additionally or alternatively, one or more processors of system 1000 may calculate a desired vertical force by summing the outputs of feedback 1018 and feed forward 1020. Additionally or alternatively, one or more processors of system 1000 may calculate a desired longitudinal force by summing the outputs of feedback 1022 and feed forward 1020.

Lateral/Directional Outer Loop Allocation 1024 and Longitudinal Outer Loop Allocation 1026 may each be configured to receive as input one or more desired forces and data received from Vehicle Sensing 1031 (e.g., airspeed, vehicle orientation, vehicle load factor, measured acceleration, vehicle mass and inertia, indications of working/failed actuators, air density, altitude, aircraft mode, whether the aircraft is in the air or on the ground, weight on wheels, etc.). Based on the inputs, Outer Loop Allocation 1024 and 1026 may be configured to command roll, command yaw, command pitch, demand thrust, or output a combination of different commands/demands in order to achieve the one or more desired forces.

Lateral/Directional Outer Loop Allocation 1024 may receive as input a desired turn-rate force and/or a desired lateral force and may command roll or command yaw. In some embodiments, Lateral/Directional Outer Loop Allocation 1024 may determine output based on a determined flight mode. A flight mode may be determined using pilot inputs (e.g., a selected mode on an inceptor) and/or sensed aircraft information (e.g., an airspeed). For example, Lateral/Directional Outer Loop Allocation 1024 may determine a flight mode of the aircraft using at least one of a determined (e.g., sensed or measured) airspeed or an input received at a pilot inceptor button (e.g., an input instructing the aircraft to fly according to a particular flight mode). In some embodiments, Lateral/Directional Outer Loop Allocation 1024 may be configured to prioritize a pilot inceptor button input over measured airspeed in determining the flight mode (e.g., the pilot inceptor button is associated with a stronger weight or higher priority than a measured airspeed). In some embodiments, Lateral/Directional Outer Loop Allocation 1024 may be configured to blend (e.g., using weighted summation) the determined airspeed and pilot inceptor button input to determine the flight mode of the aircraft. In a hover flight mode, Lateral/Directional Outer Loop Allocation 1024 may achieve the desired lateral force with a roll command (e.g., roll angle, roll rate) and may achieve the desired turn-rate force with a yaw command. In some embodiments, such as in hover flight mode, the aircraft may be configured to not be able to accelerate outside a predetermined hover envelope (e.g., hover speed range). In a forward-flight mode (e.g., horizontal flight), Lateral/Directional Outer Loop Allocation 1024 may achieve the desired lateral force with a yaw command and may achieve the desired turn-rate force with a roll command. In forward flight mode, Lateral/Directional Outer Loop Allocation 1024 may be configured to determine output based on sensed airspeed. In a transition between hover flight mode and forward flight mode, Lateral/Directional Outer Loop Allocation 1024 may achieve desired forces using a combination of a roll command and a yaw command.

Longitudinal Outer Loop Allocation 1026 may receive as input a desired vertical force and/or a desired longitudinal force and may output at least one of a pitch command (e.g., pitch angle) or a thrust vector demand. A thrust vector demand may include longitudinal thrust (e.g., mix of nacelle tilt and front propeller thrust) and vertical thrust (e.g., combined front and rear thrust). In some embodiments, Longitudinal Outer Loop Allocation 1026 may determine output based on a determined flight mode. For example, in a hover flight mode, Longitudinal Outer Loop Allocation 1026 may achieve a desired longitudinal force by lowering a pitch attitude and by using longitudinal thrust, and may achieve a desired vertical force with vertical thrust. In a forward-flight mode, Longitudinal Outer Loop Allocation 1026 may achieve a desired longitudinal force with longitudinal thrust (e.g., front propeller thrust). In a cruise flight mode, Longitudinal Outer Loop Allocation 1026 may achieve a desired vertical force by commanding pitch (e.g., raising pitch attitude) and demanding thrust (e.g., increasing longitudinal thrust).

Inner loop control laws 1028 may be configured to determine moment commands based on at least one of a roll command, yaw command, or pitch command from Lateral/Directional Outer Loop Allocation 1024 or Longitudinal Outer Loop Allocation 1026. In some embodiments, Inner loop control laws 1028 may be dependent on sensed Vehicle Dynamics (e.g., from Vehicle Sensing 1031). For example, Inner loop control laws 1028 may be configured to compensate for disturbances at the attitude and rate level in order to stabilize the aircraft. Additionally or alternatively, Inner loop control laws 1028 may consider periods of natural modes (e.g., phugoid modes) that affect the pitch axis, and may control the aircraft appropriately to compensate for such natural modes of the vehicle. In some embodiments, inner loop control laws 1028 may be dependent on vehicle inertia.

Inner loop control laws 1028 may determine moment commands using one or more stored dynamics models that reflect the motion characteristics of the aircraft (e.g., the aerodynamic damping and/or inertia of the aircraft). In some embodiments, the Inner loop control laws 1028 may use a dynamic model (e.g., a low order equivalent system model) to capture the motion characteristics of the aircraft and determine one or more moments that will cause the aircraft to achieve the commanded roll, yaw, and/or pitch. Some embodiments may include determining (e.g., by inner loop control laws 1028 or other component) a moment command based on at least one received command (e.g., a roll command, yaw command, and/or pitch command) and a determined (e.g., measured) aircraft state. For example, a moment command may be determined using a difference in the commanded aircraft state and the measured aircraft state. By way of further example, a moment command may be determined using the difference between a commanded roll angle and a measured roll angle. As described below, Control Allocation 1029 may control the aircraft (e.g., through flight elements) based on the determined moment command(s). For example, Control Allocation 1029 may control (e.g., transmit one or more commands to) one or more electric propulsion system(s) of the aircraft (e.g., electric propulsion system 602 shown in FIG. 6), including tilt actuator(s), electric engine(s), and/or propeller(s). Control Allocation 1029 may further control one or more control surface(s) of the aircraft (e.g., control surfaces, such as flaperons 712 and ruddervators 714 shown in FIG. 7), including flaperon(s), ruddervator(s), aileron(s), spoiler(s), rudder(s), and/or elevator(s).

While the embodiment shown in FIG. 10 includes both Inner Loop Control Laws 1028 and Outer Loop Allocations 1024 and 1026, in some embodiments the flight control system may not include Outer Loop Allocations 1024 and 1026. Therefore, a pilot inceptor input may create roll, yaw, pitch, and/or thrust commands. For example, a right inceptor may control roll and pitch and a left inceptor and/or pedal(s) may control yaw and thrust.

Control Allocation 1029 may accept as inputs one or more of force and moment commands, data received from the one or more aircraft sensors, envelope protection limits, scheduling parameter, and optimizer parameters. Control Allocation 1029 may be configured to determine, based on the inputs, actuator commands by minimizing an objective function that includes one or more primary objectives, such as meeting (e.g., responding to, satisfying, addressing, providing output based upon) commanded aircraft forces and moments, and one or more secondary, which can include minimizing acoustic noise and/or optimizing battery pack usage.

In some embodiments, control allocation 1029 may be configured to compute the limits of individual actuator commands based on the actuator states and envelope protection limits. Envelope protection limits may include one or more boundaries that the aircraft should operate within to ensure safe and stable flight. In some embodiments, envelope protection limits may be defined by one or more of speed, altitude, angle of attack, or load factor. For example, envelope protection limits may include one or more bending moments and/or one or more load constraints. In some embodiments, control allocation 1029 may use envelope protection limits to automatically adjust one or more control surfaces or control settings. Doing so may prevent the aircraft from undesirable scenarios such as stalling or structural strain or failure. In normal operation, the minimum command limit for a given actuator may include the maximum of: the minimum hardware based limit and the minimum flight envelope limit; and the maximum command limit for a given actuator may include the minimum of: the maximum hardware based limit and the maximum flight envelope limit. In the case of an actuator failure, the command limits for the failed actuator correspond to the failure mode.

Control allocation 1029 sends commands to one or more flight elements to control the aircraft. The flight elements will move in accordance with the controlled command. Various sensing systems and associated sensors as part of Vehicle Sensing 1031 may detect the movement of the flight elements and/or the dynamics of the aircraft and provide the information to Feedback 1012, 1016, 1018, 1022, Outer Loop allocation 1024 and 1026, Inner Loop Control laws 1028, and Control Allocation 1029 to be incorporated into flight control.

As described above, Vehicle Sensing 1031 may include one or more sensors to detect vehicle dynamics. For example, Vehicle Sensing 1031 may capture how the aircraft moves in response to pilot inputs, propulsion system outputs or ambient conditions. Additionally or alternatively, Vehicle Sensing 1031 may detect an error in the aircraft's response based on exogenous disturbances (e.g., gust causing speed disturbance). Further, Vehicle Sensing 1031 may include one or more sensors to detect propeller speed, such as a magnetic sensor (e.g., Hall effect or inductive sensor) or an optical sensor (e.g., a tachometer) configured to detect the rotor speed of the aircraft engine (and thereby the speed of the propeller). Vehicle sensing 1031 may include one or more sensors to detect a nacelle tilt angle (e.g., a propeller rotation axis angle between a lift configuration (e.g., FIG. 2) and forward thrust configuration (e.g., FIG. 1)). For example, one or more magnetic sensors (e.g., Hall effect or inductive sensor), position displacement sensors, linear displacement sensors, and/or other sensor(s) associated with the tilt actuator may detect a tilt angle (e.g., relative to the aircraft and/or wing), which may be provided to system 1000. Further, one or more pitot tubes, accelerometers, and/or gyroscopes may detect a pitch angle of the aircraft, which may be provided to system 1000. In some embodiments, Vehicle Sensing 1031 may combine tilt angle sensor measurements and aircraft pitch measurements to determine an overall nacelle tilt angle for the propellers. Vehicle sensing 1031 may include one or more sensors configured to detect an engine torque and/or thrust, such as one or more current sensors or voltage sensors, strain gauges, load cells, and/or propeller vibration sensors (e.g., accelerometers).

Vehicle sensing 1031 may include one or more sensors configured to detect vehicle dynamics, such as acceleration and/or pitch orientation sensors (e.g., accelerometer(s), 3-axis accelerometer(s), gyroscope(s), 3-axis gyroscope(s), and/or tilt-position sensors to determine angles of engines) and airspeed sensors (e.g., pitot tube sensors). Vehicle sensing 1031 may further include one or more inertial measurement units (IMUs) to determine an aircraft state based on these measurements. An aircraft state may refer to forces experienced by, an orientation of, a position of (e.g., altitude), and/or movement of, the aircraft. For example, an aircraft state may include at least one of: a position of the aircraft (e.g., a yaw angle, roll angle, pitch angle, and/or any other orientation across one or two axes), velocity of the aircraft, angular rate of the aircraft (e.g., roll, pitch, and/or yaw rate), and/or an acceleration of the aircraft (e.g., longitudinal, lateral and/or vertical acceleration), or any physical characteristic of the aircraft or one of its components.

In some embodiments, Vehicle Sensing 1031 may include an inertial navigation system (INS) and/or an air data and/or an attitude heading reference systems (ADAHRS). The inertial navigation systems (INS) and/or an air data and attitude heading reference systems (ADAHRS) may include one or more inertial measurement units (IMUs) and corresponding sensors (e.g., accelerometers, gyroscopes, three-axis gyroscopes, and/or three-axis accelerometers). In some embodiments, the INS and/or ADAHRS may filter and/or otherwise process sensor measurements to determine an aircraft state (e.g., acceleration or angular rate). For example, in some embodiments, the INS and/or ADAHRS may determine angular rates based on gyroscope measurements and may determine acceleration based on measurements from an accelerometer.

Figure 11A:
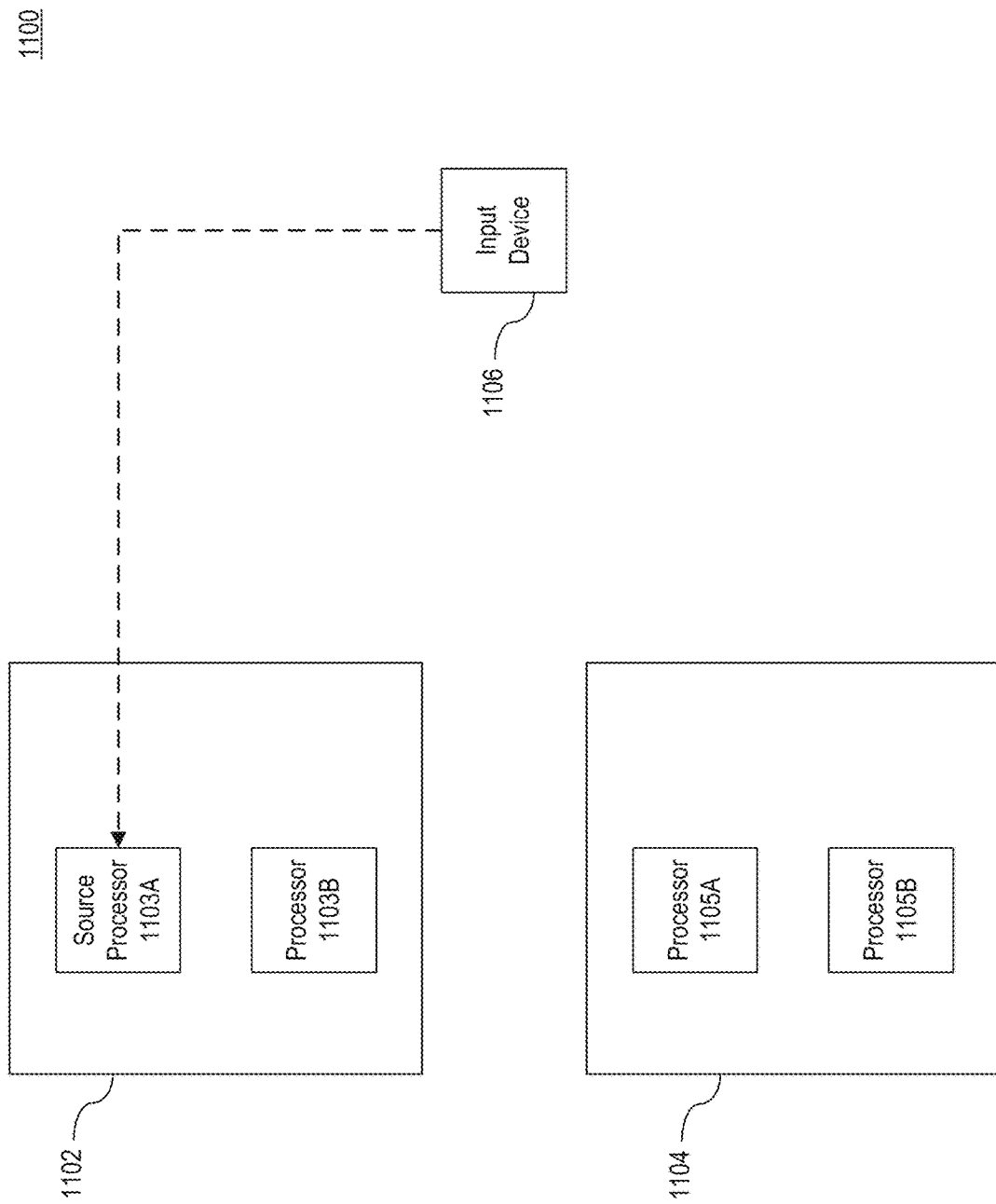
FIGS. 11A-11C illustrate an exemplary input sharing system, consistent with disclosed embodiments.
Figure 11B:
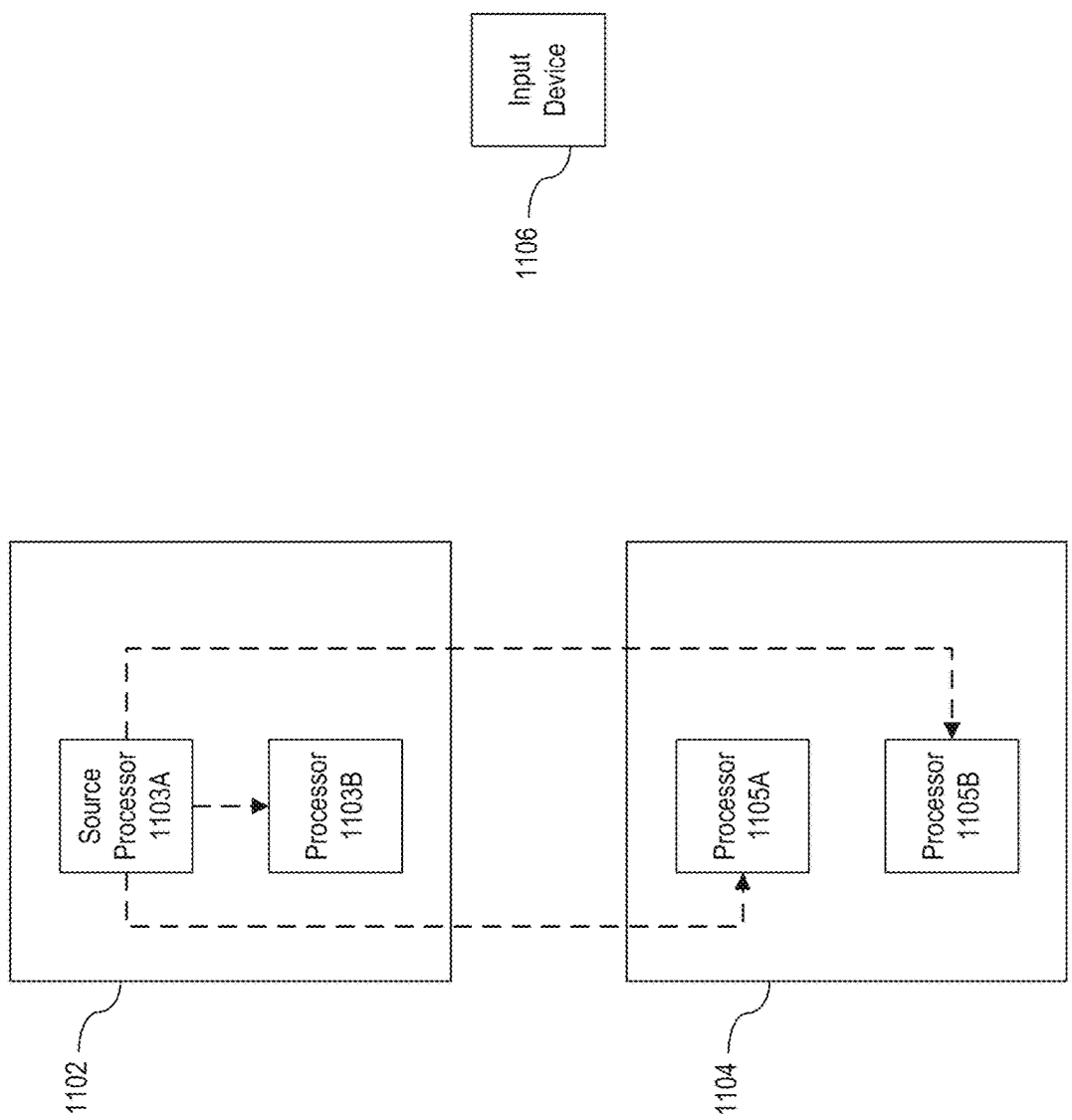
Figure 11C:
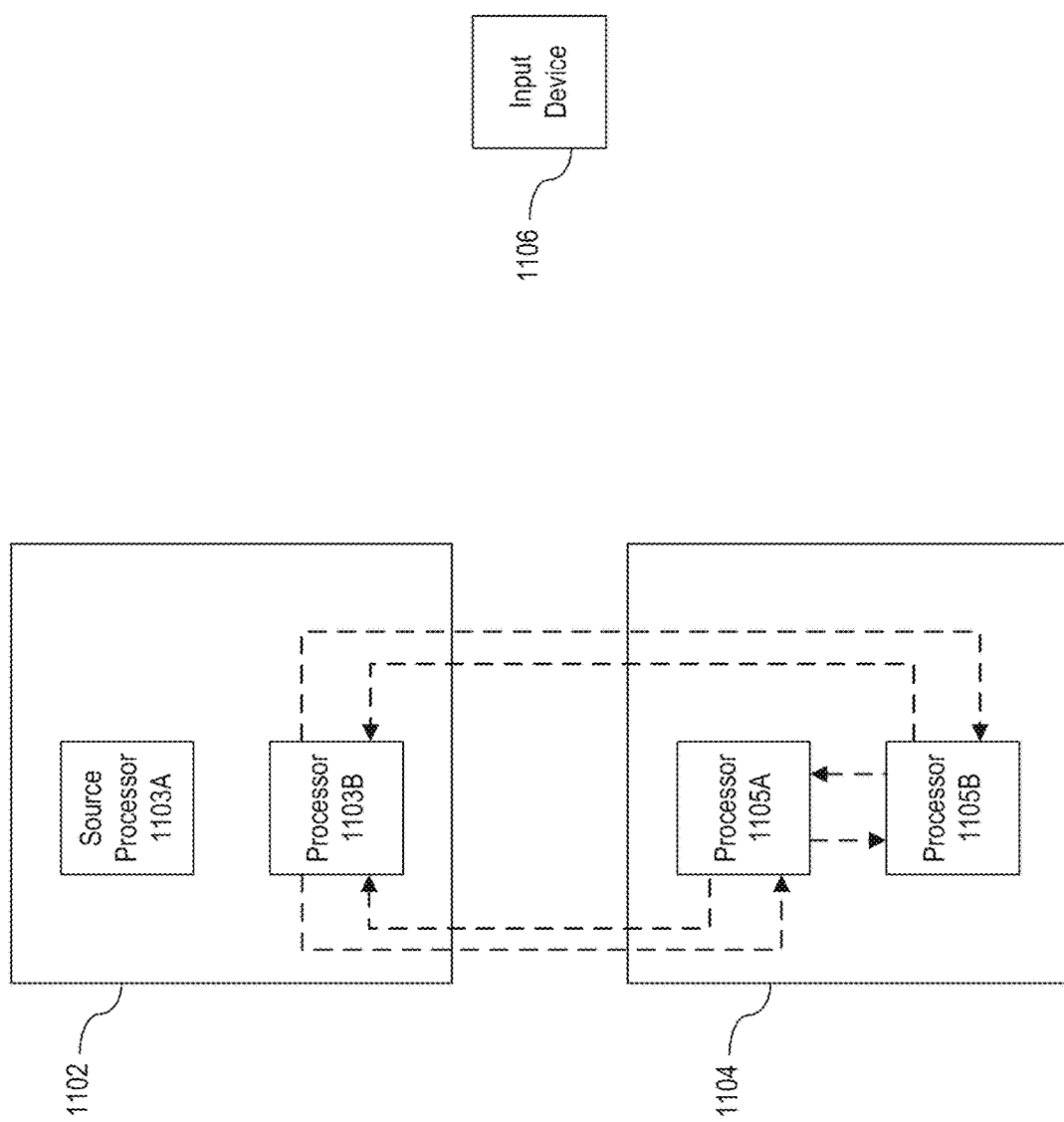

FIGS. 11A-11C illustrate an exemplary input sharing system 1100, consistent with disclosed embodiments. In some embodiments, input sharing system 1100 may include a first set of dual processors 1102 and a second set of dual processors 1104 (e.g., a dual-dual processor system). In some embodiments, input sharing system 1100 may additionally include a third set of dual processors (e.g., a triple-dual processor system). In general, it may be understood that the fault-tolerant multi-processor system and method (e.g., input sharing and validation, erroneous command mitigation) exemplified and detailed herein may comprise any number of at least two processors, including multi-processor systems such as dual-core, quad-core, hexa-core, octa-core, dual-node massively parallel processing, quad node massively parallel processing, dual-node cluster, quad-node cluster, or any other multi-processor system.

In some embodiments, a set of processors may include a plurality of independent processors, which may be included in the same enclosure. For example, first set of dual processors 1102 may include a source processor 1103A and a processor 1103B implemented as two independent processing units (e.g., chips, CPUs, FCCs) on a single printed circuit board, within a same housing or enclosure, or the like.

In some embodiments, an input sharing system may include a plurality of processors each configured to perform flight controls operations. For example, each of source processor 1103A, processor 1103B, processor 1105A, and processor 1105B may be configured to perform flight controls operations via identical and synchronized finite state machines, such as the those exemplified and described with respect to FIG. 10. In some embodiments, the plurality of processors may be synchronized using a method or system configured to convey time-accurate information. In some embodiments, the plurality of processors may be synchronized using an ethernet-based control cycle synchronization. For example, an ethernet-based control cycle synchronization may be implemented by: receiving ethernet packets containing transmission timestamp of packets sent in previous cycle, recording reception timestamps for above packets, computing local clock error from rx/tx timestamps of previous cycle's packets, and applying computed error as correction to a timer interrupt counter. Each of the identical and synchronized finite state machines may be configured to produce a same output (e.g., command signal) if they each use a same input at a same time (e.g., within a control cycle). Optionally, an ethernet-based control cycle synchronization may be used to include cyclic redundancy checks (CRCs) that provide additional integrity to signals. Furthermore, an ethernet-based control cycle synchronization may allow a same wire (e.g., ethernet wire) to convey both time accuracy and data (e.g., a copy of a signal between FCCs), which may result in a substantial increase in efficiency of such a system, as well as weight reduction for weight sensitive systems such as aircraft (which can benefit from extended range or passenger or cargo capacity if aircraft weight is reduced).

Additionally or alternatively, in some embodiments, the plurality of processors may be synchronized using a pulse-based synchronization. For example, a pulse-based synchronization may be implemented by sending a pulse signal to each device at a defined interval (e.g., regular, irregular, random).

In some embodiments, an input sharing system may include an input device. For example, input sharing system 1100 may include an input device 1106. An input device may refer to any device configured to send data to one or more processors of a multi-processor system. For example, input device 1106 may include a sensor, an actuator, an effector, a processor, an EPU, a control surface, a controller, a computer, a processor, a user input control device (e.g., a button, a switch, a stick, a slider, an inceptor, or any other device configured to generate or influence a signal based on a physical action from a pilot), or any other device configured to send data to at least one processor of input sharing system 1100. Further and with reference to FIG. 10, the data may include, for example, data from Vehicle Sensing 1031, inputs 1002a, 1002b, 1002c, 1002d, 1002e, 1002f and 1002g.

An input sharing system, which may be implemented in an aircraft, includes at least one processor. In some embodiments, an input sharing system may be configured such that an input device only sends a signal to one processor of the multi-processor system. For example, as depicted in FIG. 11A, input device 1106 may be configured to send at least one signal representing data (e.g., comprising data, encoding data, carrying data, and/or indicating data) to only source processor 1103A. A source processor may refer to the processor configured to receive a signal (e.g., data) from an associated input device (e.g., directly, such as by being a first processing device to receive the signal and/or its associated data, with other processing devices receiving a copy of the signal or its associated data). For example, as depicted in FIGS. 11A, 11B, and 11C, processor 1103A is the source processor with respect to input device 1106. However, it may be understood that for another input device (not depicted), a different, a same, or a combination of processors may be considered a source processor and/or a plurality of source processors.

In some embodiments, a signal may refer to an electromagnetic wave or any other a detectable physical quantity or impulse by which data (e.g., messages or information) can be transmitted (including a digital signal). For example, a signal may include a first instance of data sent from an input device to a source processor. In some embodiments, a copy of a signal may refer to a replication of a signal or continued propagation of the signal beyond a source processor. For example, a copy of a signal may refer to a substantially identical representation of a signal (e.g., a signal having the same data content) but propagated at a different time. A copy of a signal may include (1) an exact replication of the signal, (2) a generated representation of a signal/data received, (3) a version of the signal (e.g., an attempt at an exact replication; (4) a signal representing (e.g., comprising, encoding, carrying, and/or indicating) data, information, content, and/or payload, etc. as received or understood by a processor), and/or (5) the exact same signal simply propagated at a different time, etc. Optionally, the copy of the signal may originate from a source processor or other processor. Further, each copy of a signal (e.g., including one or more first copies, one or more second copies, etc.) may be or include a substantially identical representation (e.g., data) of the signal propagated at a different time. In some embodiments, the signal and each copy of the signal may be associated with a same control cycle (e.g., a defined amount of processing time and/or number of processor cycles, such as a control cycle frequency within a range of 20-500 Hz). For example, even though the signal and copies of the signal (e.g., first copy, second copy) may be sent at different times, a processor may associate the signal and each copy of the signal with a same control cycle such that the processor may determine a consensus signal based on (e.g., in response to, using information from) the signal and each copy of the signal, as detailed and exemplified further below.

In some embodiments, a copy of a signal may comprise data as received (and, optionally, stored at a memory) by a processor. For example, a first processor may receive a signal from an input device representing data equal to "X." The first processor may send a copy of the signal (e.g., including a different type of signal) representing data equal to "X" to a second processor. If there is a fault in the connection (e.g., wiring) between the first processor and the second processor, then second processor may receive the copy of the signal representing data equal to "Y." The second processor may then send a copy of the signal representing data equal to "Y" to a third processor. If there is no fault in the connection (e.g., wiring) between the second processor and the third processor, then the third processor may receive the copy of the signal representing data equal to "Y." Thus, a copy of a signal may comprise data differing or equal to the data of the signal while the signal and each copy of the signal are all associated with a same signal sent by an input device at a particular time (e.g., control cycle).

In some embodiments, a signal or copy of a signal may be sent once per control cycle. For example, each control cycle may include one instance of sending one or more signals and/or copies of the signals. In such embodiments, a number of consecutive control cycles (e.g., 2, 3, etc.) may be required for processors in the input sharing system to achieve consensus (e.g., determine a consensus signal). By taking a number of control cycles to achieve consensus, operating efficiency of the system may be substantially increased by increasing tolerance to skew in the system. Skew may refer to a discrepancy in timing of events, such as between control cycles of different nodes, agents, or devices in a system. For example, in a synchronized multi-processor system (e.g., FCS of aircraft), each processor may idle while waiting for the slowest or most skewed processor. This idling can cause degradation in the performance of the system (e.g., lose computing power because FCCs are idling waiting for data instead of running a control law algorithm). However, by sending a signal or copy of a signal once per control cycle (e.g., as opposed to performing all sending within a single control cycle), the tolerance for skew, performance, and efficiency of the system are substantially increased. For example, sending a signal or a copy of a signal may occur while operations are simultaneously performed to determine consensus (e.g., execute a consensus algorithm, consistent with disclosed embodiments).

In some embodiments, if a component in a system has a fault or failure, the copy of the signal (e.g., received by a non-source processor) may represent data (e.g., comprise data, encode data, and/or indicate data) data that may differ from the data of the signal (e.g., received by a source processor). For example, if a processor or wire experiences a fault or failure (e.g., indirect lightning effect, high intensity radiated field), the data of a received signal or copy of a signal may change (e.g., become corrupted). In some embodiments, a processor may be configured to utilize the difference between the data of a signal and the data of any copy of the signal to determine a faulty or erroneous processor in the system, as exemplified and detailed further below.

For example, an input device may send a signal representing data (e.g., comprising data, encoding data, carrying data, and/or indicating data) to a source processor. The source processor may save (e.g., store in a memory) the signal representing data.

In some embodiments, no two processors of a plurality of processors may be configured to receive signals from a same input device. For example, each of a plurality of devices in a system may be configured to transmit signals to only one of a plurality of processors (which may then send copies of information associated with that signal to other processors). FIG. 11A illustrates an exemplary input sharing system 1100 including input device 1106 sending a signal to only source processor 1103A. As depicted in FIG. 11A, input device 1106 does not send a signal to processors 1103B, 1105A, and 1105B. By only sending a signal to a single source processor, only one wire is required (as opposed to four wires connecting input device 1106 to each of processors 1103A, 1103B, 1105A, and 1105B). In a system with a large number of input devices, reducing the number of required wires for each input device may result in a substantial increase in efficiency of such a system, as well as weight reduction for weight sensitive systems such as aircraft (which can benefit from extended range or passenger or cargo capacity if aircraft weight is reduced). For example, the exemplary VTOL aircraft depicted in FIGS. 1 and 2, reducing the number of required wires for each input device (e.g., EPU, sensor, control surface, effector, actuator, etc.) may result in a substantial decrease in overall weight and in a substantial increase in overall efficiency. In some embodiments, source processor 1103A may save (e.g., store in a memory) the data of the received signal.

In some embodiments, the source processor may send a first copy of the signal (e.g., forwarding the originally received signal, forwarding the saved signal) to one or more other processors. Assuming no failures within the system, the first copy of the signal represents data (e.g., comprises data, encodes data, carries data, and/or indicates data) identical to the signal. The one or more other processors may save (e.g., store in a memory) the first copy of the signal. Then the one or more other processors may send a second copy of the signal (e.g., forwarding the received first copy of the signal, forwarding the saved signal) to one or more other processors.

FIG. 11B illustrates an exemplary input sharing system 1100 including source processor 1103A sending a first copy of the signal associated with input device 1106 to each of processors 1103B, 1105A, and 1105B. In some embodiment, each of processors 1103B, 1105A, and 1105B may save (e.g., store in a memory) the first copy of the signal received from source processor 1103A.

In some embodiments, a processor may send a second copy of a signal to each other processor in the system. For example, each processor that received the first copy of the signal may, after saving (e.g., storing in a memory) the first copy of the signal, send a second copy of the signal to every other processor in the system. In some embodiments, a processor may send a second copy of a signal to a subset of the other processors in the system. For example, each processor that received the first copy of the signal may, after saving (e.g., storing in a memory) the first copy of the signal, send a second copy of the signal to each other processor in the system excluding the source processor.

FIG. 11C illustrates an exemplary input sharing system 1100 including each of processors 1103B, 1105A, and 1105B sending a second copy of the signal associated with input device 1106 to each of the other two processors and not to source processor 1103A. In some embodiments, each of processors 1103B, 1105A, and 1105B may save (e.g., store in a memory) the second copies of the signal received from the other two processors.

In some embodiments, a source processor may be assigned to an input device based on the type of the input device. Assigning a source processor to an input device may include coupling (e.g., connecting via wire or wirelessly) the input device to the source processor. In some embodiments, two or more input devices of a same type are each connected to a different processor of the plurality of processors (e.g., each input device of the type is connected to a different processor). For example, in a system with four input devices of a same type (e.g., four temperature sensors), a different source processor may be assigned to each of the four input devices. Temperature sensor 1 may send a signal representing (e.g., comprising, encoding, carrying, and/or indicating) its data to source processor 1103A, temperature sensor 2 may send a signal representing its data to source processor 1103B, temperature sensor 3 may send a signal representing its data to source processor 1105A, and temperature sensor 4 may send a signal representing its data to source processor 1105B. Further, for example, in a system with four input devices of a same type (e.g., four temperature sensors), a same source processor may be assigned to each of the four input devices. Each of temperature sensors 1, 2, 3, and 4 may send a signal to source processor 1103A. In general, it may be understood that all combinations of source processor assignment are included in the present disclosure (e.g., including a subset of input devices of a same type to one source processor and another subset to another source processor). Thus, because input devices of a same type are connected to different processors, if a processor fails in a way that causes it to corrupt data, some input devices of the same type are still able to function as they are connected to other processors. In some embodiments, a source processor may be coupled to multiple input devices of different types. Optionally, a source processor may be coupled to multiple input devices of different types but with no input device to which the source processor is coupled being of a same type.

In some embodiments, a source processor may be assigned to an input device based on a location of the input device. For example, in a system with four input devices located at a same physical location or area (e.g., of an aircraft, such as a forward, port sensor), a same or a different source processor may be assigned to each of the four input devices. Further, for example, in a system with four input devices each located at a different physical location (e.g., forward, port sensor; forward, starboard sensor; aft, port sensor; aft, starboard sensor), a same or a different source processor may be assigned to each of the four input devices.

In some embodiments, a signal or a copy of a signal may represent (e.g., comprise, encode, carry, and/or indicate) data associated with a plurality of input devices. For example, for a same control cycle, each of a plurality of input devices may be configured to send data to a processor. In some embodiments, a signal may represent data from one input device (e.g., a single input device or input device of a single type). The processor may also be configured to combine or aggregate (e.g., multiplex) each received signal into a single aggregate signal, which may represent data associated with a plurality of input devices. For example, a processor (e.g., FCS, CPU configured to aggregate data) may be configured to, after receiving a plurality of signals representing data, each signal of which corresponds to an input device, combine or aggregate all the data of the received signals into a single entity (e.g., file, data structure, matrix, etc.). Further, the processor may be configured to save (e.g., store in a memory) the aggregated data. In some embodiments, the processor may be configured to send, to other processors in a same system, a copy of a signal to one or more other processors in the system, wherein the copy of the signal represents data associated with multiple input devices and associated with a same control cycle. For example, after receiving one or more signals representing data each associated with an input device, at least one processor may be configured to save (e.g., store in a memory) the data. Further, the at least one processor may be configured to aggregate or combine all the received data into a single data structure (e.g., matrix, vector, tuple, or the like). Optionally, the at least one processor may be configured to send, as a single copy of a signal, the data structure to one or more other processors in the system. By sending or relaying a single signal representing data for a plurality of input devices to one or more other processors, the efficiency of the source processor and/or system may be increased (e.g., reduce number of signals sent each cycle, reduce processing and/or energy requirement to send multiple signals to one or more other processors each control cycle).

In general, it may be understood that exemplary input sharing system 1100 as exemplified and described above and exemplary computer-implemented method for input sharing 1200 as exemplified and described below may be applied for a signal representing data or a dataset associated with a single input device or a plurality of signals each of which representing data or a dataset associated with a different input device.

Figure 12:
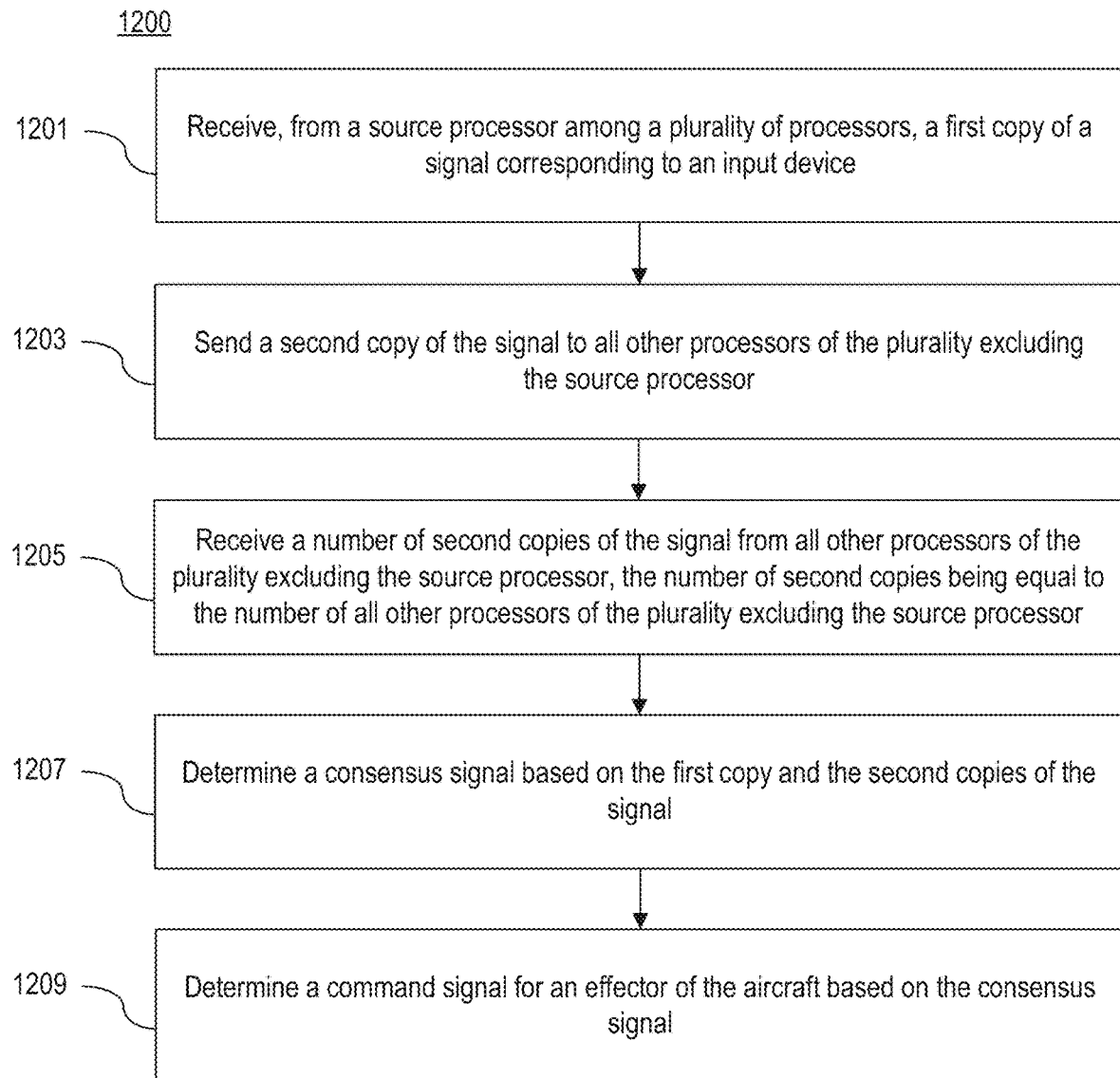
FIG. 12 illustrates an exemplary computer-implemented method for input sharing, consistent with disclosed embodiments.

FIG. 12 illustrates an exemplary computer-implemented method 1200 for input sharing, consistent with disclosed embodiments. It is appreciated that the steps of the exemplary methods depicted in FIG. 12 would be impossible, or at least impractical, to effectively implement by a human user, especially when considering that these functionalities are implemented frequently (e.g., constantly, continually), while the aircraft is flying (including taking off or landing), and/or dynamically based on (e.g., in response to) received signals (e.g., aircraft sensors, changing state measurements, pilot input devices). As one non-limiting example, exemplary computer-implemented method 1200 may be executed across three control cycles with a frequency of 100 Hz (i.e., 30 milliseconds). In general, it may be understood that any/all steps of the exemplary methods of FIG. 12 may be performed or executed by at least one processor (e.g., FCS), such as according to one or more instructions stored on a computer-readable medium (e.g., non-transitory computer-readable medium).

At step 1201, at least one processor (e.g., FCS) may receive, from a source processor among a plurality of processors, a first copy of a signal corresponding to an input device. For example and with reference to FIGS. 11A and 11B, processor 1103B may receive, from source processor 1103A, a first copy of a signal associated with (e.g., corresponding to, received from, originating from, and/or sourced from) input device 1106, which may have been first received by processor 1103A. In some embodiments, the at least one processor may save (e.g., store in a memory) the received first copy of the signal. For example, as part of or after step 1201, processor 1103B may save the first copy of the signal associated with input device 1106.

At step 1203, at least one processor (e.g., FCS) may send a second copy of the signal to all other processors of the plurality excluding the source processor. For example and with reference to FIG. 11C, processor 1103B may send, from source processor 1103A, a second copy of a signal associated with (e.g., corresponding to, received from, originating from, and/or sourced from) input device 1106 and being substantially identical (e.g., bit-for-bit identical and/or payload identical) to the received first copy of the signal. In some embodiments, the at least one processor may send the second copy of the signal to at least one other processor, such as each other processor in the system excluding the source processor. For example, processor 1103B may send a second copy of the signal to processors 1105A and 1105B but not source processor 1103A. In some embodiments, the at least one processor may send the second copy of the signal to each other processor in the system.

At step 1205, at least one processor (e.g., FCS) may receive a number of second copies of the signal from all other processors of the plurality excluding the source processor, the number of second copies being equal to the number of all other processors of the plurality excluding the source processor. For example and with reference to FIG. 11C, processor 1103B may receive, from processors 1105A and 1105B, second copies of a signal associated with (e.g., corresponding to, received from, originating from, and/or sourced from) input device 1106, which may be substantially identical to the received first copy of the signal. In some embodiments, the at least one processor may save (e.g., store in a memory) the received second copies of the signal. For example, as part of or after step 1205, processor 1103B may save the second copies of the signal associated with input device 1106 received from processors 1105A and 1105B. In some embodiments, second or third copies of signals may also be exchanged between processors 1105A and 1105B.

At step 1207, at least one processor (e.g., FCS) may determine a consensus signal based on the first copy and the second copies of the signal. In some embodiments, determining a consensus signal comprises inputting all received copies of a signal to an exact consensus agreement algorithm. An exact consensus agreement algorithm may include an algorithm, look-up table, or any other suitable computer-implemented method for determining (e.g., configured to determine, compute, etc.) a consensus signal (e.g., in which all agents, nodes, or devices in a system reach an identical agreement on a value or state). A consensus algorithm (e.g., exact consensus algorithm) may be configured to accept multiple signals (and/or copies of signals) as inputs and generate a singular consensus signal based on the accepted signals. A consensus signal may refer to a signal determined by a processor to represent data most similar to the data sent by an input device (i.e., believed to be true or non-faulty data). By determining a consensus signal based on copies of the signal received from one or more other processors, the probability that each processor uses the correct and same input into their respective finite state machines (e.g., control law algorithms) is increased and the risk of failure (e.g., determining and/or sending a faulty command signal to an effector) is decreased.

In some embodiments, an exact consensus agreement algorithm may be configured to determine a consensus signal by outputting a mode (e.g., after determining a mode) of respective datasets (e.g., a most frequently occurring dataset among a plurality of datasets) represented by (e.g., encoded by) the first copy and the second copies of the signal (e.g., a first dataset encoded by the first copy and second datasets encoded by the second copies). For example and with reference to FIGS. 11C, processor 1103B may input into an exact consensus agreement algorithm the first copy of the signal received from source processor 1103A (e.g., signal 1) and the second copies of the signal received from processors 1105A and 1105B (e.g., signal 2 and signal 3, respectively). In some embodiments, the consensus signal may be equal to the mode or majority value of the set of received copies of signals. By way of example, if signal 1 represents (e.g., comprises) data equal to "X," signal 2 represents data equal to "X," and signal 3 represents data equal to "X," then processor 1103B may determine, using an exact consensus agreement algorithm, that the consensus signal represents data equal to "X." As another example, if signal 1 represents data equal to "X," signal 2 represents data equal to "X," and signal 3 represents data equal to "Y," then the consensus signal represents data equal to "X." As yet another example, if signal 1 represents data equal to "X," signal 2 represents invalid or missing data (e.g., N/A), and signal 3 represents data equal to "X," then the consensus signal represents data equal to X.

In some embodiments, the consensus signal may be invalid if there is more than one mode of the set of received copies of signals. Additionally or alternatively, in some embodiments, the consensus signal may be invalid if there is no mode of the set of received copies of signals. For example, if signal 1 represents data equal to "X," signal 2 represents data equal to "Y," and signal 3 represents data equal to "Z," then the consensus signal represents invalid data (e.g., Ø, error signal). In some embodiments, in response to an exact consensus agreement algorithm outputting an invalid consensus signal, the processor may be configured to determine a backup consensus signal. The backup consensus signal may include the most recent non-invalid consensus signal, a received copy of the signal from a processor of a same pair of processors (e.g., processors 1105A and 1105B of pair of processors 1104), or a received copy of the signal from a processor determined to not be faulty. For example, if the exact consensus agreement algorithm outputs an invalid consensus signal, the processor (e.g., FCC) may be configured to use the consensus signal associated with the previous control cycle. Alternatively, the backup consensus signal may be one of the received copies of signals, such as one received by a particular (e.g., pre-designated) processor (e.g., a processor considered more authoritative than others) or one chosen at random.

In some embodiments, if the exact consensus agreement algorithm determines an invalid consensus signal, the processor may output a warning. For example, if the exact consensus agreement algorithm outputs an invalid consensus signal, the processor (e.g., FCC) may output a warning (e.g., audio, visual, haptic) to a user of the system (e.g., pilot of an aircraft) indicating that there is at least one faulty processor and/or connection. In some embodiments, the warning may prompt the user to input a particular command. The system may compare the particular command to resulting signals from the particular command to identify one or more faulty processors.

In some embodiments, determining a consensus signal may include determining a fault. For example, if processor 1103B received signal 1 representing data equal to "X" from source processor 1103A, signal 2 representing data equal to "X" from processor 1105A, and signal 3 representing data equal to "Y" from processor 1105B, then the processors may be configured to determine that processor 1105B and/or a connection between processor 1103B and 1105B is faulty. Additionally or alternatively, in some embodiments, a processor may be configured to output a warning in response to identifying a source of a fault. Continuing the previous example, processor 1103B may be configured to output a warning (e.g., audio, visual, haptic) to a user of the system (e.g., pilot of an aircraft) that processor 1105B is faulty. In some embodiments, in response to identifying a faulty processor, each other processor in the system may be configured to ignore all further signals from the identified faulty processor. For example, if processor 1105B is identified as being faulty, each other processor may ignore (e.g., disregard, block, not store in memory, not use as an input) all subsequent received signals from processor 1105B. In some embodiments, the consensus algorithm may be executed by an FCC, which may receive signals and/or copies of signals from a plurality of processors (e.g., COM and MON processors, processors 1103A, 1103B, 1105A, and/or 1105B).

At step 1209, at least one processor (e.g., FCS or FCC) may determine a command signal for an effector of the aircraft based on the consensus signal. In some embodiments, determining a command signal comprises inputting a consensus signal to a control law algorithm. For example, a processor (e.g., FCC) may input the consensus signal to a control law algorithm (e.g., outer loop allocation 1024, 1026; inner loop control laws 1028; control allocation 1029), as exemplified and described with respect to FIG. 10. In some embodiments, a control law algorithm may be configured to determine at least one of a thrust command (e.g., a value of thrust output) or an effector position (or an effector movement) based on the consensus signal. For example, a control law algorithm may determine a thrust command for an EPU or a position for a control surface based on the inputted consensus signal.

In some embodiments, as part of or after step 1209, at least one processor may send the command signal to a voting processor. The voting processor may include a multiplexor, data selector, or any other device configured to receive multiple input signals and send a single output signal based on one or more selection algorithms. For example, processors 1103A, 1103B, 1105A, and 1105B may each send their determined command signals to a multiplexor configured to determine a single consensus command signal. The multiplexor may be configured to determine the consensus command signal by selecting the mode of the set of received command signals.

Figure 13:
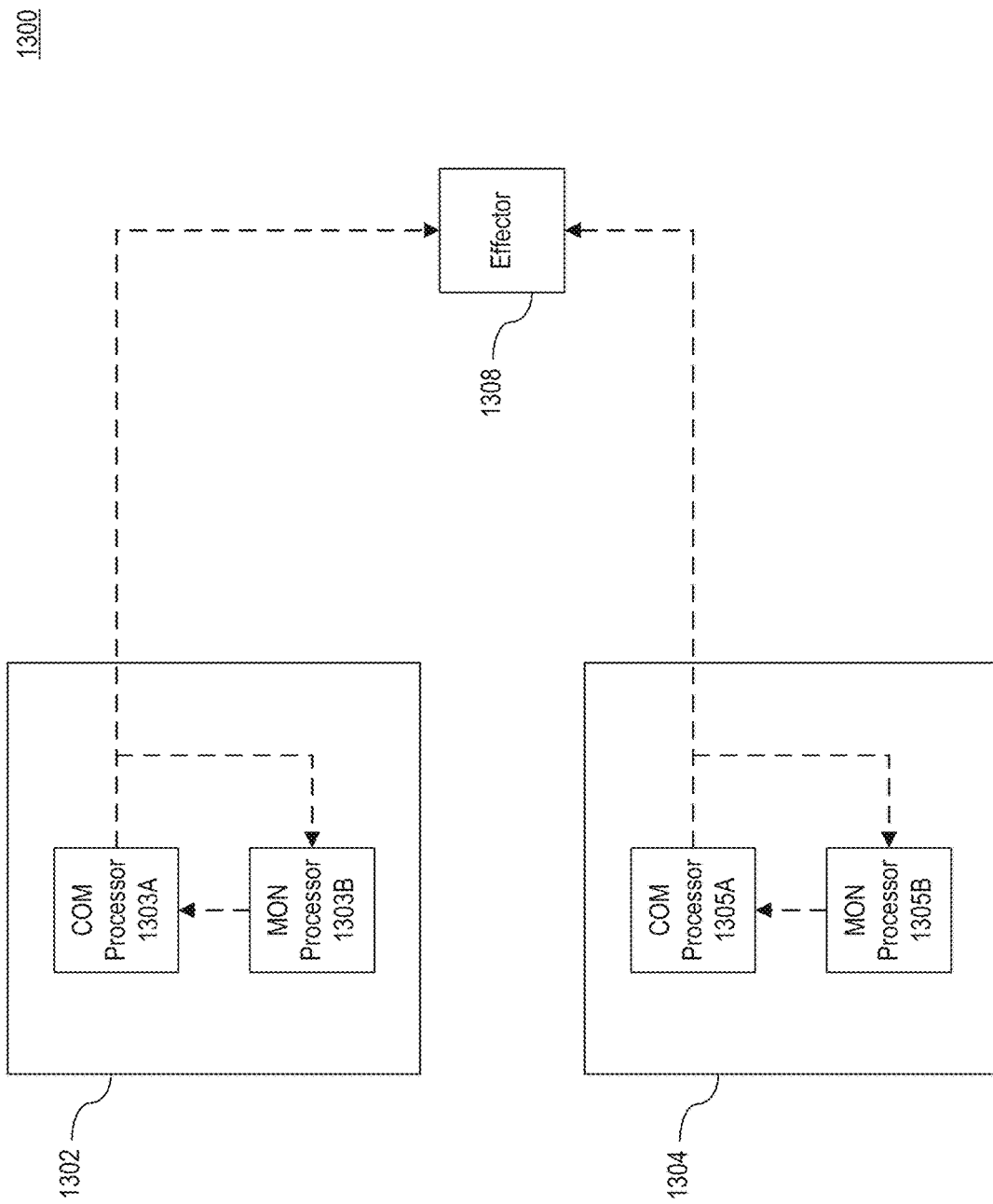
FIG. 13 illustrates an exemplary erroneous command mitigation system, consistent with disclosed embodiments.

FIG. 13 illustrates an exemplary erroneous command mitigation system 1300, consistent with disclosed embodiments. In some embodiments, erroneous command mitigation system 1300 may include a first pair of processors 1302, a second pair of processors 1304, and an effector 1308. Erroneous command mitigation system 1300 may be part of an aircraft, consistent with disclosed embodiments. An effector may include a control surface, an actuator, a motor, an EPU, or any other movable aircraft structure configured to influence aircraft behavior. In some embodiments, a pair of processors may be associated with (e.g., part of) an FCC, consistent with disclosed embodiments. First pair of processors includes COM processor 1303A and MON processor 1303B and second pair of processors includes COM processor 1305A and MON processor 1305B. A COM processor may refer to a processor configured to generate commands (e.g., compute flight control commands), and a MON processor may refer to a processor configured to monitor a COM processor (e.g., verify that commands computed by COM processor are correct). In general, it may be understood that MON processors 1303B and 1305B may instead be COM processors configured to additionally monitor the corresponding COM processor of the pair of processors (e.g., in a COM/COM architecture).

In some embodiments, at least one processor of each pair of processors may be configured to generate a command signal. For example, COM processor 1303A, MON processor 1303B, COM processor 1305A, and MON processor 1305B may each be configured to generate a command signal for effector 1308 (e.g., as detailed and exemplified with respect to FIG. 10). In some embodiments, an effector may be configured to receive a command signal. For example, effector 1308 may be configured to receive a command signal from pairs of processors 1302 and 1304.

In some embodiments, each monitor processor may be configured to compare a first command signal generated by a corresponding command processor with a second command signal generated by the monitor processor. For example, MON processor 1303B may be configured to receive a command signal generated by the corresponding processor of the pair of processors (i.e., COM processor 1303A). Further, MON processor 1303B may be configured to generate a command signal. Because each processor of the pair of processors are configured to run identical, synchronized finite state machines based on identical inputs (as detailed and exemplified with respect to FIGS. 11A, 11B, 11C, and 12), COM processor 1303A and MON processor 1303B should generate identical command signals. MON processor 1303B may be configured to compare the command signal generated by COM processor 1303A with the command signal generated by MON processor 1303B and to identify if a difference exists between the two command signals using one or more comparison operations. In some embodiments, COM processor 1303A, MON processor 1303B, COM processor 1305A, and MON processor 1305B may be configured to exchange information (e.g., state information, signals and/or copies of signals), which may allow the processors to stay in sync with each other and avoid transients, which can cause aircraft-wide disruptions, if a processor is inhibited. For example, COM processor 1303A may be an instance of source processor 1103A, MON processor 1303B may be an instance of processor 1103B, COM processor 1305A may be an instance of processor 1105A, and MON processor 1305B may be an instance of processor 1105B.

In some embodiments, comparing a first command signal generated by a corresponding command processor with a second command signal generated by the monitor processor may include a consensus algorithm. For example, the monitor processor may use an exact consensus algorithm or an approximate consensus algorithm to determine whether the first command signal is substantially identical to and/or substantially differs from the second command signal (e.g., represents data that is identical within a threshold number of bits). An approximate consensus algorithm may include an algorithm, look-up table, or any other suitable computer-implemented method for determining a consensus signal in which all agents, nodes, or devices in a system do not need to reach an exactly identical state, but their states must be close to each other within a certain predefined tolerance or margin of error. A substantial difference between the first command signal and the second command signal may include the first command signal comprising a command that is more than a predefined threshold compared to the second command signal. For example, if the first command signal commands a control surface actuator to actuate 5 millimeters, the second command signal commands the same control surface actuator to actuate 10 millimeters, and the predetermined threshold is a 1% difference, then the monitor processor may inhibit its corresponding command processor.

In some embodiments, each monitor processor may be configured to, in response to determining the first command signal differs from the second command signal, inhibit the corresponding command processor. For example, if MON processor 1303B identifies (e.g., detects) a difference between the command signal generated by COM processor 1303A and the command signal generated by MON processor 1303B, MON processor 1303B may be configured to inhibit COM processor 1303A. Inhibiting a processor may include shutting down the processor, blocking (permanently or temporarily) further signals from being sent by the processor (e.g., to at least one effector), or any other suitable method for preventing the processor from successfully sending a signal to another device. In some embodiments, after inhibiting a corresponding command processor, each monitor processor may be configured to output a warning. For example, after inhibiting COM processor 1303A, MON processor 1303B may output a warning (e.g., audio, visual, haptic) to a user of the system (e.g., pilot of an aircraft) indicating that COM processor 1303A has been inhibited.

In some embodiments, an effector may be configured to act (e.g., actuate, adjust, move, maintain position, etc.) based on the command signal received from a first pair of processors. For example, effector 1308 may be configured to receive command signals from both pairs of processors 1302 and 1304 but may primarily act (e.g., actuate, adjust, move, etc.) based on commands received from pair of processors 1302 (e.g., act only based on commands received from pair of processors 1302 and ignore commands received from pair of processors 1304). Additionally or alternatively, in some embodiments, an effector may be configured to act (e.g., actuate, adjust, move, maintain position, etc.) based on the command signal received from a second pair of processors after at least one processor in a first pair of processors is inhibited. For example, effector 1308 may be configured to act (e.g., actuate, adjust, move, etc.) based on commands received from pair of processors 1304 after COM processor 1303A is inhibited. In some embodiments, an effector may be configured to determine if a first pair of processors is inhibited. For example, the effector may determine a first pair of processors is inhibited after not receiving any command signals from the first pair of processors for a predetermined number of control cycles (e.g., 1 cycle, 5 cycles, 10 cycles) and/or a predetermined amount of time (e.g., 10 ms, 100 ms, 1000 ms).

In some embodiments, a command from one pair of processors may not be sent to an effector unless a command from another processor or pair of processors is inhibited. For example, COM processor 1305A may not transmit commands to effector 1308 unless or until it detects that commands from COM processor 1303A are inhibited.

In some embodiments, an effector (e.g., a processor associated with the effector, which may be a processor connected to, or included as part of, an effector) may be configured to determine if a received command signal is classified as reversible or not reversible. A reversible command may include a command that can be reversed and/or does not put the system into a dangerous or risky state. For example, a reversible command may include modifying an engine torque while the engine is running or altering a position of a control surface by commanding an actuator. A not reversible command may include a command that cannot be reversed or cannot be easily reversed and/or does put the system into a potentially dangerous or risky state. For example, a not reversible command may include blowing a pyrotechnic fuse. As another example, a not reversible command may include a command that may take a large amount of time (e.g., beyond a predetermined threshold) to reverse, such as shutting down an EPU. Additionally or alternatively, a not reversible command may include at least one of a command to stow an engine or a command to cause the aircraft to enter a particular mode (e.g., a maintenance mode). In some embodiments, reversible commands may be associated with a first set of aircraft components, and not reversible commands may be associated with a second set of aircraft components (e.g., which may not overlap with the first set).

In some embodiments, an effector (e.g., a processor associated with the effector, which may be a processor connected to, or included as part of, an effector) may be configured to determine a classification of the command signal is based on a data structure stored a memory component of an effector. For example, effector 1308 may be configured to determine if a received command signal is reversible or not reversible by searching or querying a data structure, database, look-up table, or the like stored in a memory of the effector. Additionally or alternatively, in some embodiments, the command signal may comprise a message header or tag indicating the classification of the message.

In some embodiments, an effector (e.g., a processor associated with the effector, which may be a processor connected to, or included as part of, an effector) may be configured to, after determining that the command signal is reversible, act after receiving a first number of command signals and/or copies of command signals, such as only a single copy of the command signal. For example, effector 1308 may be configured to immediately modify an engine torque after receiving a single copy of a command signal comprising that instruction. In some embodiments, an effector may be configured to, after determining that the command signal is not reversible, act after receiving multiple copies of the command signal. For example, effector 1308 may be configured to blow a pyrotechnic fuse after receiving a second number of command signals and/or copies of command signals, such as multiple copies of a same command signal comprising that instruction. In some embodiments, the first number of command signals and/or copies of command signals may be based on (e.g., correlated with) a speed (e.g., clock speed) of a processor receiving and/or transmitting the command signals and/or copies of command signals. Additionally or alternatively, the same may be true for the second number of command signals and/or copies of command signals. By requiring multiple copies (e.g., five copies, 10 copies; copies corresponding to five control cycles, 10 control cycles) of not reversible commands, effector 1308 provides a time window for a monitor processor to correctly inhibit a faulty command processor before the system is put into a risky or dangerous state.

Figure 14:
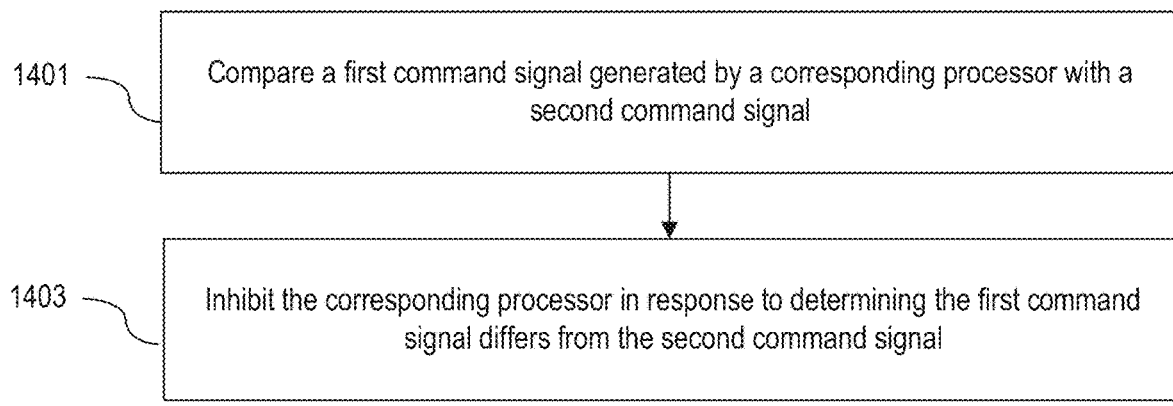
FIG. 14 illustrates an exemplary computer-implemented method for erroneous command mitigation, consistent with disclosed embodiments.
Figure 15:
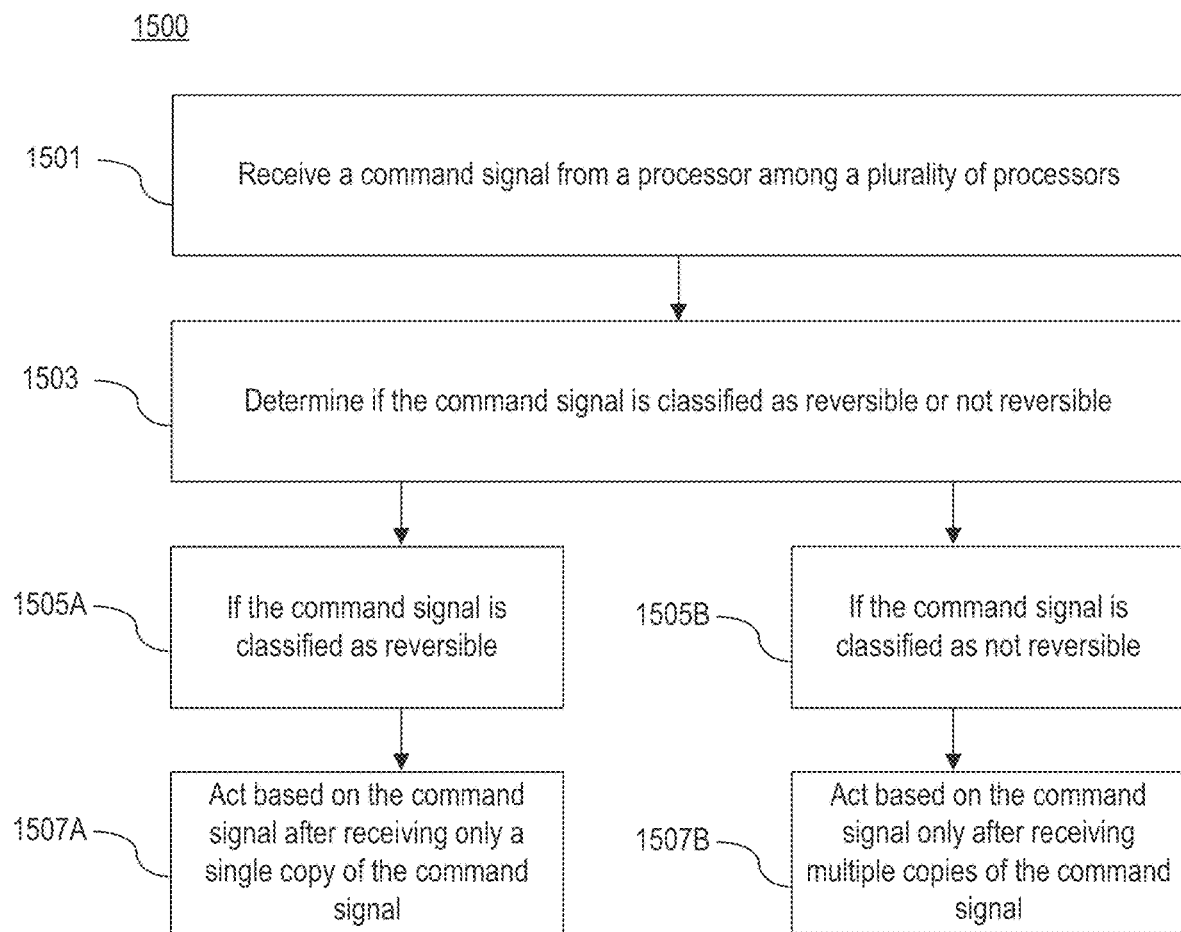
FIG. 15 illustrates an exemplary computer-implemented method for erroneous command mitigation, consistent with disclosed embodiments.

FIGS. 14 and 15 illustrates an exemplary computer-implemented method for erroneous command mitigation, consistent with disclosed embodiments. It is appreciated that the steps of the exemplary methods depicted in FIGS. 14 and 15 would be impossible, or at least impractical, to effectively implement by a human user, especially when considering that these functionalities are implemented frequently (e.g., constantly, continually), while the aircraft is flying (including taking off or landing), and/or dynamically based on (e.g., in response to) received signals (e.g., aircraft sensors, changing state measurements, pilot input devices). In general, it may be understood that any/all steps of the exemplary methods of FIGS. 14 and 15 may be performed or executed by at least one processor (e.g., FCS, effector), such as according to one or more instructions stored on a computer-readable medium (e.g., non-transitory computer-readable medium).

FIG. 14 illustrates an exemplary computer-implemented method 1400 for erroneous command mitigation for a command signal generating processor of a system (e.g., FCC).

At step 1401, at least one processor (e.g., monitor processor, FCC) may compare a first command signal generated by a corresponding processor with a second command signal. For example, MON processor 1303B may compare a first command signal generated by COM processor 1303A with a second command signal generated by MON processor 1303B.

At step 1403, at least one processor (e.g., monitor processor, FCC) may inhibit a corresponding processor in response to determining that the first command signal differs from the second command signal. For example, MON processor 1303B may inhibit COM processor 1303A. Further, in some embodiments, a processor may output a warning after inhibiting a corresponding processor. For example, MON processor 1303B may output a warning (e.g., audio, visual, haptic) to a user of the system (e.g., pilot of an aircraft) after inhibiting COM processor 1303A indicating that COM processor 1303A has been inhibited.

In some embodiments, computer-implemented method 1400 may include a subsequent step where the inhibited processor may be de-inhibited. For example, computer-implemented method 1400 may de-inhibit the inhibited processor based on (e.g., in response to) receiving a reset command (e.g., a manual input, an override command), which may be generated only in response to human input. Additionally or alternatively, computer-implemented method 1400 may de-inhibit the inhibited processor based on (e.g., in response to) monitoring subsequent commands (e.g., comparing to commands from another source, such as another COM processor) from the inhibited processor and determining that the monitored commands satisfy an accuracy metric (e.g., a predetermined number of monitored commands that match commands from another source, a predetermined amount of time when the monitored commands match commands from another source).

FIG. 15 illustrates an exemplary computer-implemented method 1500 for erroneous command mitigation for an effector of a system (e.g., EPU, BMS). It is appreciated that the steps of the exemplary methods depicted in FIG. 15 would be impossible, or at least impractical, to effectively implement by a human user, especially when considering that these functionalities are implemented frequently (e.g., constantly, continually), while the aircraft is flying (including taking off or landing), and/or dynamically based on (e.g., in response to) received signals (e.g., aircraft sensors, changing state measurements, pilot input devices). As one non-limiting example, exemplary computer-implemented method 1500 may be executed in a range of two to ten control cycles with a frequency of 100 Hz (i.e., range of 20 milliseconds to 100 milliseconds). In general, it may be understood that any/all steps of the exemplary methods of FIG. 15 may be performed or executed by at least one processor (e.g., FCS), such as according to one or more instructions stored on a computer-readable medium (e.g., non-transitory computer-readable medium).

At step 1501, at least one processor (e.g., associated with the effector, which may be a processor connected to, or included as part of, an effector) may receive a command signal from a processor among a plurality of processors. In some embodiments, an effector may be configured to receive a command signal from a processor among a plurality of processors. For example, effector 1308 may receive a command signal from COM processor 1303A.

At step 1503, at least one processor (e.g., effector) may determine if the command signal is classified as reversible or not reversible. In some embodiments, determining a classification of the command signal is based on a data structure stored in a memory component, which may be part of an effector. For example, effector 1308 may use (e.g., search, query) a data structure, database, look-up table, or the like stored in a memory to determine if a received command signal is classified as reversible or not reversible. In some embodiments, determining a classification of the command signal is based on a message header or tag indicating that the classification of the command signal. For example, effector 1308 may be configured to determine a command signal with a reversible tag as reversible.

At steps 1505A and 1507A, at least one processor (e.g., associated with an effector) may act (e.g., actuate, adjust, move, maintain position, etc.) based on the command signal after receiving only a single copy of the command signal. For example, effector 1308 may immediately act based on a received command signal after determining the command signal is reversible.

At steps 1505B and 1507B, at least one processor (e.g., associated with an effector) may act (e.g., actuate, adjust, move, maintain position, etc.) based on the command signal after receiving multiple copies of the command signal. For example, effector 1308 may act based on a received command signal after determining the command signal is not reversible only after receiving multiple copies (e.g., five copies, 10 copies; copies corresponding to five control cycles, 10 control cycles).

Additional aspects of the present disclosure may be further described via the following clauses:

1. A signal-processing multi-processor system for an aircraft, comprising:
   a plurality of processors, wherein each processor is configured to perform operations comprising:
      receiving, from a source processor among the plurality of the processors, a first copy of a signal corresponding to an input device;
      sending a second copy of the signal to all other processors of the plurality excluding the source processor, wherein the second copy of the signal is substantially identical to the first copy of the signal;
      receiving a number of second copies of the signal from all other processors of the plurality excluding the source processor, the number of second copies being equal to the number of all other processors of the plurality excluding the source processor;
      determining a consensus signal based on the first copy and the second copies of the signal; and
      determining a command signal for an effector of the aircraft based on the consensus signal, and
   wherein no two processors of the plurality receive the signal from a same input device, and
   wherein the effector is a movable aircraft structure.

2. The system of clause 1, wherein determining the consensus signal comprises inputting all received copies of the signal to an exact consensus agreement algorithm.

3. The system of clause 2, wherein the exact consensus agreement algorithm determines the consensus signal by outputting a mode of respective datasets encoded by the first copy and the second copies of the signal.

4. The system of any one of clauses 1-3, wherein determining the command signal comprises inputting the consensus signal to a control law algorithm.

5. The system of clause 4, wherein the control law algorithm determines at least one of a thrust command or an effector position based on the consensus signal.

6. The system of any one of clauses 1-5, further comprising:
   the effector,
   wherein the plurality of processors comprise:
      a first pair of processors comprising a first command processor and a first monitor processor; and
      a second pair of processors comprising a second command processor and a second monitor processor,
      wherein the effector is configured to act based on the command signal received from the first pair of processors.

7. The system of clause 6, wherein each monitor processor is configured to:
   compare a first command signal generated by a corresponding command processor with a second command signal generated by the monitor processor; and
   in response to determining the first command signal differs from the second command signal, inhibit the corresponding command processor.

8. The system of clause 7, wherein the effector is further configured to act based on the command signal received from the second pair of processors after determining the first command processor is inhibited.

9. The system of any one of clauses 6-8, wherein the effector is further configured to:
   receive the command signal;
   determine if the command signal is classified as reversible or not reversible;
   if the command signal is classified as reversible:
      act based on the command signal after receiving only a single copy of the command signal; and
   if the command signal is classified as not reversible:
      act based on the command signal only after receiving multiple copies of the command signal.

10. The system of clause 9, wherein determining a classification of the command signal is based on a data structure stored in a memory component of the effector.

11. The system of any one of clauses 1-10, wherein the input device is one or more of:
   a sensor; and
   the effector.

12. The system of any one of clauses 1-11, wherein two or more input devices of a same type are each connected to a different processor of the plurality of processors.

13. The system of any one of clauses 1-12, wherein the signal is an aggregate signal representing data from a plurality of input devices.

14. The system of any one of clauses 1-13, wherein the signal represents data from one input device.

15. The system of clause 13 or 14, wherein the signal representing data includes the signal encoding or carrying the data.

16. A computer-implemented method for controlling an aircraft, comprising:
   receiving, from a source processor among a plurality of processors, a first copy of a signal corresponding to an input device;
   sending a second copy of the signal to all other processors of the plurality excluding the source processor, wherein the second copy of the signal is substantially identical to the first copy of the signal;
   receiving a number of second copies of the signal from all other processors of the plurality excluding the source processor, the number of second copies being equal to the number of all other processors of the plurality excluding the source processor;
   determining a consensus signal based on the first copy and the second copies of the signal; and
   determining a command signal for an effector of the aircraft based on the consensus signal, and
   wherein no two processors of the plurality receive the signal from a same input device, and
   wherein the effector is a movable aircraft structure.

17. The computer-implemented method of clause 16, wherein determining the consensus signal comprises inputting all received copies of the signal to an exact consensus agreement algorithm.

18. The computer-implemented method of clause 17, wherein the exact consensus agreement algorithm determines the consensus signal by outputting a mode of respective datasets encoded by the first copy and the second copies of the signal.

19. The computer-implemented method of any one of clauses 16-18, wherein determining the command signal comprises inputting the consensus signal to a control law algorithm.

20. The computer-implemented method of clause 19, wherein the control law algorithm determines at least one of a thrust command or an effector position based on the consensus signal.

21. The computer-implemented method of any one of clauses 16-20, further comprising: the effector,
   wherein the plurality of processors comprise:
      a first pair of processors comprising a first command processor and a first monitor processor; and
      a second pair of processors comprising a second command processor and a second monitor processor,
      wherein the effector is configured to act based on the command signal received from the first pair of processors.

22. The computer-implemented method of clause 21, wherein each monitor processor is configured to:
   compare a first command signal generated by a corresponding command processor with a second command signal generated by the monitor processor; and
   in response to determining the first command signal differs from the second command signal, inhibit the corresponding command processor.

23. The computer-implemented method of clause 22, wherein the effector is further configured to act based on the command signal received from the second pair of processors after determining the first command processor is inhibited.

24. The computer-implemented method of any one of clauses 21-23, wherein the effector is further configured to:
   receive the command signal;
   determine if the command signal is classified as reversible or not reversible;
   if the command signal is classified as reversible:
      act based on the command signal after receiving only a single copy of the command signal; and
   if the command signal is classified as not reversible:
      act based on the command signal only after receiving multiple copies of the command signal.

25. The computer-implemented method of clause 24, wherein determining a classification of the command signal is based on a data structure stored in a memory component of the effector.

26. The computer-implemented method of any one of clauses 16-25, wherein the input device is one or more of:
   a sensor; and
   the effector.

27. The computer-implemented method of any one of clauses 16-26, wherein two or more input devices of a same type are each connected to a different processor of the plurality of processors.

28. The computer-implemented method of any one of clauses 16-27, wherein the signal is an aggregate signal representing data from a plurality of input devices.

29. The computer-implemented method of any one of clauses 16-28, wherein the signal represents data from one input device.

30. The computer-implemented method of clause 28 or 29, wherein the signal representing data includes the signal encoding or carrying the data.

31. A non-transitory computer-readable medium storing instructions that, when executed by at least one processor, cause the at least one processor to perform operations comprising:
   receiving, from a source processor among a plurality of processors, a first copy of a signal corresponding to an input device;
   sending a second copy of the signal to all other processors of the plurality excluding the source processor, wherein the second copy of the signal is substantially identical to the first copy of the signal;
   receiving a number of second copies of the signal from all other processors of the plurality excluding the source processor, the number of second copies being equal to the number of all other processors of the plurality excluding the source processor;

determining a consensus signal based on the first copy and the second copies of the signal; and determining a command signal for an effector of an aircraft based on the consensus signal, and wherein no two processors of the plurality receive the signal from a same input device, and wherein the effector is a movable aircraft structure.

32. The non-transitory computer-readable medium of clause 31, wherein determining the consensus signal comprises inputting all received copies of the signal to an exact consensus agreement algorithm.

33. The non-transitory computer-readable medium of clause 32, wherein the exact consensus agreement algorithm determines the consensus signal by outputting a mode of respective datasets encoded by the first copy and the second copies of the signal.

34. The non-transitory computer-readable medium of any one of clauses 31-33, wherein determining the command signal comprises inputting the consensus signal to a control law algorithm.

35. The non-transitory computer-readable medium of clause 34, wherein the control law algorithm determines at least one of a thrust command or an effector position based on the consensus signal.

36. The non-transitory computer-readable medium of any one of clauses 31-35, further comprising:
the effector,
wherein the plurality of processors comprise:
a first pair of processors comprising a first command processor and a first monitor processor; and
a second pair of processors comprising a second command processor and a second monitor processor,
wherein the effector is configured to act based on the command signal received from the first pair of processors.

37. The non-transitory computer-readable medium of clause 36, wherein each monitor processor is configured to:
compare a first command signal generated by a corresponding command processor with a second command signal generated by the monitor processor; and
in response to determining the first command signal differs from the second command signal, inhibit the corresponding command processor.

38. The non-transitory computer-readable medium of clause 37, wherein the effector is further configured to act based on the command signal received from the second pair of processors after determining the first command processor is inhibited.

39. The non-transitory computer-readable medium of any one of clauses 36-38, wherein the effector is configured to:
receive the command signal;
determine if the command signal is classified as reversible or not reversible;
if the command signal is classified as reversible:
act based on the command signal after receiving only a single copy of the command signal; and
if the command signal is classified as not reversible:
act based on the command signal only after receiving multiple copies of the command signal.

40. The non-transitory computer-readable medium of clause 39, wherein determining a classification of the command signal is based on a data structure stored in a memory component of the effector.

41. The non-transitory computer-readable medium of any one of clauses 31-40, wherein the input device is one or more of:
a sensor; and
the effector.

42. The non-transitory computer-readable medium of any one of clauses 31-41, wherein two or more input devices of a same type are each connected to a different processor of the plurality of processors.

43. The non-transitory computer-readable medium of any one of clauses 31-42, wherein the signal is an aggregate signal representing data from a plurality of input devices.

44. The non-transitory computer-readable medium of any one of clauses 31-43, wherein the signal represents data from one input device.

45. The non-transitory computer-readable medium of clause 43 or 44, wherein the signal representing data includes the signal encoding or carrying the data.

46. A signal-processing multi-processor system for an aircraft, comprising:
a first pair of processors comprising a first command processor and a first monitor processor;
a second pair of processors comprising a second command processor and a second monitor processor; and
an effector configured to act based on a command signal received from the first pair of processors,
wherein each monitor processor is configured to:
compare a first command signal generated by a corresponding command processor with a second command signal generated by the monitor processor; and
in response to determining the first command signal differs from the second command signal, inhibit the corresponding command processor, and wherein the effector is a movable aircraft structure.

47. The system of clause 46, wherein the effector is further configured to act based on a command signal received from the second pair of processors after determining the first command processor is inhibited.

48. The system of clause 46 or 47, wherein the effector is further configured to:
receive the command signal;
determine if the command signal is classified as reversible or not reversible;
if the command signal is classified as reversible:
act based on the command signal after receiving only a single copy of the command signal; and
if the command signal is classified as not reversible:
act based on the command signal only after receiving multiple copies of the command signal.

49. The system of clause 48, wherein determining a classification of the command signal is based on a data structure stored in a memory component of the effector.

50. The system of any one of clauses 46-49, wherein each processor is configured to perform operations comprising:
receiving, from a source processor among the plurality of the processors, a first copy of a signal corresponding to an input device;
sending a second copy of the signal to all other processors of the plurality excluding the source processor, wherein the second copy of the signal is substantially identical to the first copy of the signal;
receiving a number of second copies of the signal from all other processors of the plurality excluding the source processor, the number of second copies being equal to the number of all other processors of the plurality excluding the source processor;

determining a consensus signal based on the first copy and the second copies of the signal; and determining a command signal for the effector of the aircraft based on the consensus signal.

51. The system of clause 50, wherein no two processors of the plurality receive the signal from a same input device.

52. The system of clause 50 or 51, wherein determining the consensus signal comprises inputting all received copies of the signal to an exact consensus agreement algorithm.

53. The system of clause 52, wherein the exact consensus agreement algorithm determines the consensus signal by outputting a mode of respective datasets encoded by the first copy and the second copies of the signal.

54. The system of any one of clauses 50-53, wherein determining the command signal comprises inputting the consensus signal to a control law algorithm.

55. The system of clause 54, wherein the control law algorithm determines at least one of a thrust command or an effector position based on the consensus signal.

56. The system of any one of clauses 50-55, wherein the input device is one or more of:
   a sensor; and
   the effector.

57. The system of any one of clauses 50-56, wherein two or more input devices of a same type are each connected to a different processor of the plurality of processors.

58. The system of any one of clauses 50-57, wherein the signal is an aggregate signal represents data from a plurality of input devices.

59. The system of any one of clauses 50-58, wherein the signal represents data from one input device.

60. The system of clause 58 or 59, wherein the signal representing data includes the signal encoding or carrying the data.

61. A computer-implemented method for controlling an aircraft, comprising:
   comparing a first command signal generated by a command processor with a second command signal generated by a monitor processor;
   determining if the first command signal substantially differs from the second command signal;
   if the first command signal does not substantially differ from the second command signal: sending the first command signal to an effector; and
   if the first command signal does substantially differ from the second command signal: inhibiting the corresponding command processor,
   wherein the effector is a movable aircraft structure.

62. The computer-implemented method of clause 61, further comprising:
   receiving the first command signal;
   determining if the command signal is classified as reversible or not reversible;
   if the command signal is classified as reversible:
      acting based on the command signal after receiving only a single copy of the command signal; and
   if the command signal is classified as not reversible:
      acting based on the command signal only after receiving multiple copies of the command signal.

63. The computer-implemented method of clause 61 or 62, wherein determining a classification of the command signal is based on a data structure stored in a memory component of the effector.

64. The computer-implemented method of any one of clauses 61-63, further comprising:
   receiving, from a source processor among a plurality of the processors, a first copy of a signal corresponding to an input device;
   sending a second copy of the signal to all other processors of the plurality excluding the source processor, wherein the second copy of the signal is substantially identical to the first copy of the signal;
   receiving a number of second copies of the signal from all other processors of the plurality excluding the source processor, the number of second copies being equal to the number of all other processors of the plurality excluding the source processor;
   determining a consensus signal based on the first copy and the second copies of the signal; and
   determining a command signal for the effector of the aircraft based on the consensus signal.

65. The computer-implemented method of clause 64, wherein no two processors of the plurality receive the signal from a same input device.

66. The computer-implemented method of clause 64 or 65, wherein determining the consensus signal comprises inputting all received copies of the signal to an exact consensus agreement algorithm.

67. The computer-implemented method of clause 66, wherein the exact consensus agreement algorithm determines the consensus signal by outputting a mode of respective datasets encoded by the first copy and the second copies of the signal.

68. The computer-implemented method of any one of clauses 64-67, wherein determining the command signal comprises inputting the consensus signal to a control law algorithm.

69. The computer-implemented method of clause 68, wherein the control law algorithm determines at least one of a thrust command or an effector position based on the consensus signal.

70. The computer-implemented method of any one of clauses 64-69, wherein the input device is one or more of:
   a sensor; and
   the effector.

71. The computer-implemented method of any one of clauses 64-70, wherein two or more input devices of a same type are each connected to a different processor of the plurality of processors.

72. The computer-implemented method of any one of clauses 64-71, wherein the signal is an aggregate signal represents data from a plurality of input devices.

73. The computer-implemented method of any one of clauses 64-72, wherein the signal represents data from one input device.

74. The computer-implemented method of clause 72 or 73, wherein the signal representing data includes the signal encoding or carrying the data.

75. A non-transitory computer-readable medium storing instructions that, when executed by at least one processor, cause the at least one processor to perform operations comprising:
   comparing a first command signal generated by a command processor with a second command signal generated by a monitor processor;
   determining if the first command signal substantially differs from the second command signal;
   if the first command signal does not substantially differ from the second command signal: sending the first command signal to an effector; and
   if the first command signal does substantially differ from the second command signal:

inhibiting the corresponding command processor,
wherein the effector is a movable aircraft structure.

76. The non-transitory computer-readable medium of clause 75, wherein the operations further comprise:
receiving the first command signal;
determining if the command signal is classified as reversible or not reversible;
if the command signal is classified as reversible:
acting based on the command signal after receiving only a single copy of the command signal; and
if the command signal is classified as not reversible:
acting based on the command signal only after receiving multiple copies of the command signal.

77. The non-transitory computer-readable medium of clause 75 or 76, wherein determining a classification of the command signal is based on a data structure stored in a memory component of the effector.

78. The non-transitory computer-readable medium of any one of clauses 75-77, wherein the operations further comprise:
receiving, from a source processor among a plurality of the processors, a first copy of a signal corresponding to an input device;
sending a second copy of the signal to all other processors of the plurality excluding the source processor, wherein the second copy of the signal is substantially identical to the first copy of the signal;
receiving a number of second copies of the signal from all other processors of the plurality excluding the source processor, the number of second copies being equal to the number of all other processors of the plurality excluding the source processor;
determining a consensus signal based on the first copy and the second copies of the signal; and
determining a command signal for the effector of an aircraft based on the consensus signal.

79. The non-transitory computer-readable medium of clause 78, wherein no two processors of the plurality receive the signal from a same input device.

80. The non-transitory computer-readable medium of clause 78 or 79, wherein determining the consensus signal comprises inputting all received copies of the signal to an exact consensus agreement algorithm.

81. The non-transitory computer-readable medium of clause 80, wherein the exact consensus agreement algorithm determines the consensus signal by outputting a mode of respective datasets encoded by the first copy and the second copies of the signal.

82. The non-transitory computer-readable medium of any one of clauses 78-81, wherein determining the command signal comprises inputting the consensus signal to a control law algorithm.

83. The non-transitory computer-readable medium of clause 82, wherein the control law algorithm determines at least one of a thrust command or an effector position based on the consensus signal.

84. The non-transitory computer-readable medium of any one of clauses 78-83, wherein the input device is one or more of:
a sensor; and
the effector.

85. The non-transitory computer-readable medium of any one of clauses 78-84, wherein two or more input devices of a same type are each connected to a different processor of the plurality of processors.

86. The non-transitory computer-readable medium of any one of clauses 78-85, wherein the signal is an aggregate signal represents data from a plurality of input devices.

87. The non-transitory computer-readable medium of any one of clauses 78-86, wherein the signal represents data from one input device.

88. The non-transitory computer-readable medium of clause 86 or 87, wherein the signal representing data includes the signal encoding or carrying the data.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. As used herein, unless specifically stated otherwise, being "based on" may include being dependent on, being interdependent with, being associated with, being defined at least in part by, being influenced by, or being responsive to. As used herein, "related to" may include being inclusive of, being expressed by, being indicated by, or being based on. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein. It is also intended that the sequence of steps shown in figures is only for illustrative purposes and is not intended to be limited to any particular sequence of steps. As such, those skilled in the art can appreciate that these steps can be performed in a different order while implementing the same method.

What is claimed is:

1. A signal-processing multi-processor system for an aircraft, comprising:
a plurality of processors, wherein each processor is configured to perform operations comprising:
receiving, from a source processor among the plurality of the processors, a first copy of a signal corresponding to an input device;

sending a second copy of the signal to all other processors of the plurality excluding the source processor, wherein the second copy of the signal is substantially identical to the first copy of the signal;
receiving a number of second copies of the signal from all other processors of the plurality excluding the source processor, the number of second copies being equal to the number of all other processors of the plurality excluding the source processor;
determining a consensus signal based on the first copy and the second copies of the signal; and
determining a command signal for an effector of the aircraft based on the consensus signal, and
wherein no two processors of the plurality receive the signal from a same input device.

2. The system of claim 1, wherein determining the consensus signal comprises inputting all received copies of the signal to an exact consensus agreement algorithm.

3. The system of claim 2, wherein the exact consensus agreement algorithm determines the consensus signal by outputting a mode of respective datasets encoded by the first copy and the second copies of the signal.

4. The system of claim 1, wherein determining the command signal comprises inputting the consensus signal to a control law algorithm.

5. The system of claim 4, wherein the control law algorithm determines at least one of a thrust command or an effector position based on the consensus signal.

6. The system of claim 1, further comprising:
the effector,
wherein the plurality of processors comprise:
  a first pair of processors comprising a first command processor and a first monitor processor; and
  a second pair of processors comprising a second command processor and a second monitor processor,
  wherein the effector is configured to act based on the command signal received from the first pair of processors.

7. The system of claim 6, wherein each monitor processor is configured to:
compare a first command signal generated by a corresponding command processor with a second command signal generated by the monitor processor; and
in response to determining the first command signal differs from the second command signal, inhibit the corresponding command processor.

8. The system of claim 7 wherein the effector is further configured to act based on the command signal received from the second pair of processors after determining the first command processor is inhibited.

9. The system of claim 6, wherein the effector is further configured to:
receive the command signal;
determine if the command signal is classified as reversible or not reversible;
if the command signal is classified as reversible:
  act based on the command signal after receiving only a single copy of the command signal; and
if the command signal is classified as not reversible:
  act based on the command signal only after receiving multiple copies of the command signal.

10. The system of claim 9, wherein determining a classification of the command signal is based on a data structure stored in a memory component of the effector.

11. The system of claim 1, wherein two or more input devices of a same type are each connected to a different processor of the plurality of processors.

12. A computer-implemented method for controlling an aircraft, comprising:
receiving, from a source processor among a plurality of processors, a first copy of a signal corresponding to an input device;
sending a second copy of the signal to all other processors of the plurality excluding the source processor, wherein the second copy of the signal is substantially identical to the first copy of the signal;
receiving a number of second copies of the signal from all other processors of the plurality excluding the source processor, the number of second copies being equal to the number of all other processors of the plurality excluding the source processor;
determining a consensus signal based on the first copy and the second copies of the signal; and
determining a command signal for an effector of the aircraft based on the consensus signal, and
wherein no two processors of the plurality receive the signal from a same input device.

13. The computer-implemented method of claim 12, wherein:
determining the consensus signal comprises inputting all received copies of the signal to an exact consensus agreement algorithm, and
the exact consensus agreement algorithm determines the consensus signal by outputting a mode of respective datasets encoded by the first copy and the second copies of the signal.

14. The computer-implemented method of claim 12, wherein:
determining the command signal comprises inputting the consensus signal to a control law algorithm, and
the control law algorithm determines at least one of a thrust command or an effector position based on the consensus signal.

15. The computer-implemented method of claim 12, further comprising:
the effector,
wherein the plurality of processors comprise:
  a first pair of processors comprising a first command processor and a first monitor processor; and
  a second pair of processors comprising a second command processor and a second monitor processor,
  wherein the effector is configured to act based on the command signal received from the first pair of processors.

16. The computer-implemented method of claim 15, wherein each monitor processor is configured to:
compare a first command signal generated by a corresponding command processor with a second command signal generated by the monitor processor; and
in response to determining the first command signal differs from the second command signal, inhibit the corresponding command processor.

17. The computer-implemented method of claim 16, wherein the effector is further configured to act based on the command signal received from the second pair of processors after determining the first command processor is inhibited.

18. The computer-implemented method of claim 15, wherein the effector is further configured to:
receive the command signal;
determine if the command signal is classified as reversible or not reversible;
if the command signal is classified as reversible:
  act based on the command signal after receiving only a single copy of the command signal; and if the command signal is classified as not reversible:
  act based on the command signal only after receiving multiple copies of the command signal.

19. The computer-implemented method of claim 18, wherein determining a classification of the command signal is based on a data structure stored in a memory component of the effector.

20. The computer-implemented method of claim 12, wherein two or more input devices of a same type are each connected to a different processor of the plurality of processors.

21. A signal-processing multi-processor system for an aircraft, comprising:
  a first pair of processors comprising a first command processor and a first monitor processor;
  a second pair of processors comprising a second command processor and a second monitor processor; and
  an effector configured to act based on the command signal received from the first pair of processors,
  wherein each monitor processor is configured to:
    compare a first command signal generated by a corresponding command processor with a second command signal generated by the monitor processor; and
    in response to determining the first command signal differs from the second command signal, inhibit the corresponding command processor.

22. The system of claim 21, wherein the effector is further configured to act based on the command signal received from the second pair of processors after determining the first command processor is inhibited.

23. The system of claim 21, wherein the effector is further configured to:
  receive the command signal;
  determine if the command signal is classified as reversible or not reversible;
  if the command signal is classified as reversible:
    act based on the command signal after receiving only a single copy of the command signal; and
  if the command signal is classified as not reversible:
    act based on the command signal only after receiving multiple copies of the command signal.

24. The system of claim 23, wherein determining a classification of the command signal is based on a data structure stored in a memory component of the effector.

25. The system of claim 21, wherein each processor is configured to perform operations comprising:
  receiving, from a source processor among the plurality of the processors, a first copy of a signal corresponding to an input device;
  sending a second copy of the signal to all other processors of the plurality excluding the source processor, wherein the second copy of the signal is substantially identical to the first copy of the signal;
  receiving a number of second copies of the signal from all other processors of the plurality excluding the source processor, the number of second copies being equal to the number of all other processors of the plurality excluding the source processor;
  determining a consensus signal based on the first copy and the second copies of the signal; and
  determining a command signal for the effector of the aircraft based on the consensus signal, wherein no two processors of the plurality receive the signal from a same input device.

26. The system of claim 25, wherein determining the consensus signal comprises inputting all received copies of the signal to an exact consensus agreement algorithm.

27. The system of claim 26, wherein the exact consensus agreement algorithm determines the consensus signal by outputting a mode of respective datasets encoded by the received first copy and the second copies of the signal.

28. The system of claim 25, wherein determining the command signal comprises inputting the consensus signal to a control law algorithm.

29. The system of claim 28, wherein the control law algorithm determines at least one of a thrust command or an effector position based on the consensus signal.

30. The system of claim 25, wherein two or more input devices of a same type are each connected to a different processor of the plurality of processors.

* * * * *